(12) United States Patent
Wang et al.

(10) Patent No.: US 10,560,921 B2
(45) Date of Patent: Feb. 11, 2020

(54) METHOD AND APPARATUS FOR RADIO RESOURCES MANAGEMENT

(71) Applicant: Samsung Electronics Co., Ltd., Suwon-si, Gyeonggi-do (KR)

(72) Inventors: Hong Wang, Beijing (CN); Xiaowan Ke, Beijing (CN); Lixiang Xu, Beijing (CN)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/924,731

(22) Filed: Mar. 19, 2018

(65) Prior Publication Data
US 2018/0213506 A1 Jul. 26, 2018

Related U.S. Application Data

(63) Continuation of application No. 14/791,343, filed on Jul. 3, 2015, now Pat. No. 9,924,494.

(30) Foreign Application Priority Data

Jul. 4, 2014 (CN) .......................... 2014 1 0318246

(51) Int. Cl.
*H04W 72/00* (2009.01)
*H04L 12/18* (2006.01)
*H04W 4/06* (2009.01)
*H04W 28/02* (2009.01)
*H04W 28/08* (2009.01)

(52) U.S. Cl.
CPC ......... *H04W 72/005* (2013.01); *H04L 12/189* (2013.01); *H04W 4/06* (2013.01); *H04W 28/02* (2013.01); *H04W 28/08* (2013.01)

(58) Field of Classification Search
None
See application file for complete search history.

(56) References Cited

U.S. PATENT DOCUMENTS

| 2009/0253435 A1 | 10/2009 | Olofsson et al. |
| 2012/0163168 A1 | 6/2012 | Choi |
| 2013/0301539 A1 | 11/2013 | Aguirre et al. |

(Continued)

FOREIGN PATENT DOCUMENTS

| CN | 102045643 A1 | 5/2011 |
| CN | 103636242 A | 3/2014 |

OTHER PUBLICATIONS

Int'l Search Report for PCT/KR2015/006963 dated Nov. 26, 2015.
(Continued)

*Primary Examiner* — Rebecca E Song
(74) *Attorney, Agent, or Firm* — The Farrell Law Firm, P.C.

(57) ABSTRACT

Various examples provide a method for radio resources management. An MCE or a GCSE AS or a UE receives usage information of eMBMS radio resources, and adjusts radio resources in response to a determination that there is an overload state. The MCE may re-configure the eMBMS radio resources. Alternatively, the UE or the GCSE AS may establish a unicast channel for transporting a GCSE service which was transmitted on an overloaded eMBMS bearer, and release the eMBMS bearer. The technical mechanism can make effective use of radio interface resources and reduce data loss.

12 Claims, 14 Drawing Sheets

301 MCE receives usage information of eMBMS radio resources

302 MCE re-configures the eMBMS radio resources according to the report of the eNB to eliminate an overload state

(56) References Cited

U.S. PATENT DOCUMENTS

| | | | | |
|---|---|---|---|---|
| 2014/0192701 A1* | 7/2014 | Drevo | ................... | H04W 4/06 |
| | | | | 370/312 |
| 2015/0180676 A1* | 6/2015 | Bao | ................... | H04L 12/1886 |
| | | | | 370/230 |
| 2016/0105894 A1* | 4/2016 | Lu | ................... | H04W 72/005 |
| | | | | 370/329 |
| 2018/0288576 A1* | 10/2018 | Xu | ................... | H04W 4/06 |

OTHER PUBLICATIONS

3GPP TR 23.768 v12.1.0, '3GPP; TSGSSA; Study on architecture enhancements to support Group Communication System Enablers for LTE (GCSE_LTE) (Release 12), pp. 13-20, dated Jun. 24, 2014.

Extended European Search Report for PCT/KR2015/006963 dated Jan. 24, 2018 (10 pgs).

Huawei et al: "Notification of MBMS conditions", 3GPP Draft; S2-142496_Notification of MBMS Conditions_V1.4, 3rd Generation Partnership Project (3GPP), Mobile Competence Centre, XP050836929 dated Jul. 7-11, 2014 (3 pages).

Motorola Solutions: "Motivation for new proposed WID: E-Utran Notification of MBMS Events by the Network (NOMEN)", 3GPP Draft; RP-140725_Motivation for_NEWWID_NOMEN, 3rd Generation Partnership Project (3GPP), Mobile Competence Centre, XP050781719 dated Jun. 10-13, 2014 (2 pages).

\* cited by examiner

METHOD AND APPARATUS FOR RADIO RESOURCES MANAGEMENT

CROSS-REFERENCE TO RELATED APPLICATIONS/INCORPORATION BY REFERENCE

The present application is a continuation of U.S. application Ser. No. 14/791,343 titled "METHOD AND APPARATUS FOR RADIO RESOURCES MANAGEMENT" and filed on Jul. 3, 2015, (to issue as U.S. Pat. No. 9,924,494), which in turn claims priority to and claims the benefit of Chinese Patent Application No. 201410318246.3 filed on Jul. 4, 2014. The contents of each of the above applications are hereby incorporated herein by reference in their entirety.

TECHNICAL FIELD

The present disclosure relates to wireless communications, and particularly, to a method and an apparatus for radio resources management.

BACKGROUND

Modern mobile communications are tending to provide high speed transmission of multimedia services for users. FIG. 1 is a schematic diagram illustrating a structure of a long term evolution (LTE) system.

In the system, user equipment (UE) 101 is a terminal device which receives data. Evolved universal terrestrial radio access network (E-UTRAN) 102 is a wireless access network using evolved Node B (eNodeBs, eNBs) or Node Bs (NodeBs, NBs) to provide the UEs 101 with interfaces for accessing the wireless network 102. Mobility management entity (MME) 103 manages mobility context, session context and security information of UEs 101. Serving gateway (SGW) 104 provides user plane functions. MME 103 and SGW 104 may reside in the same physical entity. Packet data network (PDN) gateway (PGW) 105 implements functions including accounting, lawful interception and so on, and may reside in the same physical entity with SGW 104. Policy and charging rules functions (PCRF) 106 provides Quality of Service (QoS) policies and charging rules. Serving GPRS support node (SGSN) 108 is a network node device providing routing for data transmission in the universal mobile telecommunications system (UMTS). Home subscriber server (HSS) 109 is a home sub system of the UE, and maintains user information including a current location of the UE, the address of the serving node, user security information, packet data context of the UE, and so on.

Group call services aim at providing a fast and effective mechanism to distribute data copies to users in a group. The concept of group call has been adopted in land mobile radio (LMR) systems for public security organizations. A typical application of group call is providing a "Push to Talk" (PTT) function. When group call is introduced into LTE systems, the LTE group call services need to support at least PTT audio communication and generate performances comparable to performances of conventional group communications. Group call services in system architecture evolution (SAE) are required to support UE in different states and UEs in different environments. LTE provides wide band data transmission, and group call services of LTE are required to support data communications of voice, video and the like.

Group communication service enabler (GCSE) of LTE enables group call by introducing functions of the application layer into 3$^{rd}$ generation partnership project (3GPP) standards. LTE users are divided into different groups, and a user may belong to one or multiple different GCSE groups. A user that receives GCSE service data in a GCSE group is referred to as a receiving group member, and a user that sends service data is referred to as a sending group member. Group call is communication between a sending group member and a receiving group member. Group call is also required to enable a user to communicate with multiple groups. For example, a user may carry out voice service with a group, and meanwhile perform video or data communication with another group.

In order to use air interface resources effectively, service data that is to be received by multiple receiving users is provided to the users via broadcasting and multicasting. The service is also referred to as multimedia broadcast and multicast service (MBMS). Each MBMS bearer provides services within its service area. Each cell in a service area has a dedicated control channel (MCCH) for transmitting MBMS signaling. Broadcast multicast service center (BM-SC) is an MBMS providing center which sends MBMS data to an MBMS gateway (MBMS-GW). MBMS-GW is a logic node or a network node between a BM-SC and an eNB, and is for sending/broadcasting MBMS data packets to each eNB that is to transmit data. The MBMS-GW sends a data packet to an eNB which transmits data to a user. Control signaling is sent by the BM-SC to the MBMS-GW, and then sent to E-UTRAN by an MME. Multi-cell/multicast coordination entity (MCE) is a node in E-UTRAN which receives MBMS signaling, decides the multicast-broadcast single-frequency network (MBSFN) transmission mode that is to be adopted and sends signaling to a corresponding eNB. In conventional mechanisms, a continuous area is defined, and eNBs in the area synchronously transmit the same MBMS signals on the same carrier to improve reception quality of MBMS services at users. The continuous area is referred to as a single frequency network (SFN) area. An SFN area includes a group of cells that cover a continuous geological area. The cells synchronously transmit a certain MBMS service using the same radio resources.

A GCSE service may be transmitted on a LTE evolved multimedia broadcast multicast service (eMBMS) bearer or on a unicast bearer. FIG. 2 is a schematic diagram illustrating an architecture of transmitting a GCSE service via an eMBMS bearer and via a unicast bearer. A GCSE application server (GCSE AS) sends service data to an MBMS GW, and the MBMS-GW sends the service data to multiple UEs via an eMBMS bearer. Alternatively, the service data may be sent to a PGW, and the PGW sends the service data to a UE via a unicast bearer.

But conventional eMBMS techniques cannot satisfy requirements of GCSE services, for example, GCSE services require a data bearer to be established within 300 ms, but according to eMBMS, an MCE needs to first send signaling to all of eNBs in an MBSFN and the eNBs synchronously transmit MBMS control information via respective air interfaces, the time needed by the process has exceeded the time required by the GCSE services. At present, two methods are proposed to solve the problem. According to one method, eMBMS bearers are established in advance. According to the other method, unicast bearers are established in the network, and data is transmitted to receiving group members via the unicast bearers. Meanwhile, the network starts to establish eMBMS bearers. After the eMBMS bearers are established, data are transmitted to the receiving group members via the eMBMS bearers. Within a time period, data is transmitted via the unicast bearers and the eMBMS bearers simultaneously.

The methods can avoid the delay in bearer establishment, but the following problems are still to be solved.

In current eMBMS systems, an MCE allocates radio resources for eMBMS, and multiple eMBMS channel (MCH) share the eMBMS radio resources. An MBMS channel may be reused by multiple MBMS services. GCSE services characterize in that there is no GCSE data transmission in most of the time in each cyclic time period of a GCSE group and active time in which there is data transmission is very short. In addition, different groups have different active time, and generally do not transmit GCSE service data at the same time. Therefore, data of multiple GCSE services can be transmitted over an air interface in a multiplexing manner to use air interface resources effectively. When the number of users in a group increases or when the number of GCSE user groups increases or when the number of users in a group is unchanged but the amount of to-be-transmitted data increases significantly, there may be a sudden increase in the amount of data and the pre-allocated eMBMS radio resources may become not enough to transmit the increased amount of data. When data exceeds the transmission capacity of the transmission channel, an eNB may discard service data on the last bearer multiplexed on the MCH. A large amount of data loss generates problems in group call services, and UEs and GCSE AS cannot take actions to solve the problems because they do not know the problem.

Another problem is that when group call service data cannot be transmitted properly because resources of some MBMS bearers may be occupied by other services that have higher priority levels or because an eNB malfunctions, UEs and GCSE AS cannot take measures of solve the problem because they do not know the problem. Therefore, a radio access network (RAN) node needs to report the situation to the GCSE AS.

Another problem is that all eNBs within an MBSFN perform the same actions. Therefore, all the eNBs within the MBSFN report the same information, and the repeatedly reported data is redundant for an M2 interface.

BRIEF SUMMARY

Various examples of the present disclosure provide a method and an apparatus for radio resources management. The mechanism of the various examples can effectively use air interface resources, reduce data loss, and reduce signaling load and data transmitted via network interfaces.

A method for radio resources management may include:
an MCE receives usage information of eMBMS radio resources sent by an eNB;
re-configuring, by the MCE, the eMBMS radio resources to eliminate an overloaded state when the MCE determines that the eMBMS radio resources are in the overloaded state according to the usage information of the eMBMS radio resources.

In an example, the usage information of the eMBMS radio resources sent by the eNB may include: an indication indicating whether the radio resources of the eMBMS are overloaded.

In an example, the indication indicating whether the radio resources of the eMBMS are overloaded may include: an indication and an MBSFN range corresponding to the overloaded resources; or
an indicator, an MBSFN range corresponding to the overloaded resources and an identity of an MCH that is overloaded; or
an indicator, a temporary mobile group identity (TMGI) of a specified eMBMS bearer on an overloaded MCH.

In an example, the identity of the MCH may be: an MCH serial number reported to the eNB by the MCE or an MCH serial number determined based on an order of MCHs configured in a message including MCE configuration and scheduling information.

In an example, the specified eMBMS bearer may include: an eMBMS bearer which has packet loss, or an eMBMS bearer that bears the largest amount of data;
all of eNBs within the same MBSFN area that report the usage information of the eMBMS radio resources have the same specific eMBMS bearer.

In an example, the usage information of the eMBMS radio resources sent by the eNB may include actual usage condition of eMBMS radio resources within an MBSFN area.

In an example, the MCE determines a usage level of the radio resources according to the actual usage condition of the radio resources;
when the usage level of the eMBMS radio resources in the MBSFN area is fully loaded or overloaded, the method may also include: the MCE rejects a session start message for a new eMBMS bearer sent by an MME.

In an example, the actual usage condition of the eMBMS radio resources may include: actual usage condition of radio resources of each MCH in an MBSFN.

In an example, the method may also include: the MCE informs the eNB of the identity of each MCH; the actual usage condition of the eMBMS radio resources sent by the eNB includes the identity of each MCH and the actual usage condition of radio resources of each MCH; or
actual usage condition of radio resources of MCHs sent by the eNB are arrange in the order of configuration information of the MCHs arranged in a configuration and scheduling message; or
the actual usage condition of the eMBMS radio resources sent by the eNB may include usage condition of each MCH and a TMGI of a specific eMBMS bearer or TMGIs of all of eMBMS bearers that reuse the MCH.

In an example, the MCE determines a usage level of the radio resources according to the actual usage condition of the radio resources;
when the usage level of resources of all MCHs in an MBSFN area is overloaded, the method may also include: the MCE rejects a session start message for a new eMBMS bearer sent by an MME.

In an example, the actual usage condition of radio resources may include: a resource usage level, or a percentage value of actually in-use radio resources in allocated resources, or a percentage value of idle radio resources in allocated resources, or the amount of actually transmitted data, or the amount of data that can be transported by radio resources.

In an example, the method may also include: the MCE selects an eNB in an MBSFN area, and configures the eNB to send usage information of eMBMS radio resources in the MBSFN area.

In an example, the MCE configures the eNB via an M2 setup response message or a customized message.

In an example, the eNB is configured to send the usage information of the eMBMS radio resources periodically or in response to a trigger event.

In an example, the procedure of reconfiguring the eMBMS radio resources may include:
the MCE increases radio resources allocated to the eMBMS; or the MCE increases radio resources allocated to an overloaded MCH, and reduces radio resources allocated to an MCH not overloaded.

In an example, the method may also include: the MCE receives information from the eNB indicating the overloaded state has been eliminated, accepts a session start message for a new eMBMS bearer sent by the MME.

A method for radio resources management may include: receiving, by a GCSE AS, usage information of eMBMS radio resources sent by a BM-SC; the usage information of the eMBMS radio resources is determined by the BM-SC according to usage information of the eMBMS radio resources sent by an eNB via an MCE; adjusting, by the GCSE AS, scheduling of services transported on the eMBMS radio resources according to the usage information of the eMBMS radio resources.

In an example, the information about usage of radio resources of the eMBMS sent by the eNB may include: an indication indicating whether the radio resources of the eMBMS are overloaded;

when forwarding the usage information of the radio resources, the MCE forwards an overload indication and a TMGI of an eMBMS bearer, or forwards an overload indication and information of an overload range;

the usage information of the eMBMS radio resources sent by the BM-SC includes: an overload indication and a TMGI of an eMBMS bearer forwarded by the MCE, or an overload indication and TMGI of one or multiple eMBMS bearers selected by the BM-SC from overload range information forwarded by the MCE, or an overload indication and overload range information forwarded by the MCE;

the procedure of the GCSE AS adjusting the scheduling of services transported on the eMBMS radio resources may include: establishing using a unicast channel a GCSE service corresponding to an eMBMS bearer identified by the TMGI sent by the BM-SC or a GCSE service corresponding to the one or multiple eMBMS bearers selected from the overload range information sent by the BM-SC, and informing the BM-SC to release the eMBMS bearer.

In an example, the identity of the eMBMS bearer forwarded by the MCE may include: a TMGI of an eMBMS bearer included in the information sent by the eNB, or the TMGI of one or multiple eMBMS bearers selected by the MCE from an MBSFN area included in the information sent by the eNB; and/or the overload range information forwarded by the MCE may include: an MBSFN identity included in the information sent by the eNB, or a service area identity (SAI) determined by the MCE using the MBSFN identity included in the information.

In an example, the indication indicating whether the radio resources of the eMBMS are overloaded may include: an overload indication and an MBSFN range corresponding to the overload; or an overload indicator, an MBSFN area corresponding to the overload and an identity of an MCH that is overloaded; or an overload indicator, a TMGI identity of a specified eMBMS bearer on an overloaded MCH.

In an example, the identity of the MCH may be: an MCH serial number reported to the eNB by the MCE or an MCH serial number determined based on an order of MCHs configured in a message including MCE configuration and scheduling information.

In an example, the usage information of the eMBMS radio resources sent by the eNB may include usage information of eMBMS radio resources within an MBSFN area.

In an example, when forwarding the usage information of the eMBMS radio resources, the MCE forwards actual usage condition of the eMBMS radio resources sent by the eNB, or forwards a usage state of the eMBMS radio resources determined using the actual usage condition of the eMBMS radio resources and a range of the eMBMS radio resources;

the usage information of the eMBMS radio resources sent by the BM-SC may include: the actual usage condition of the eMBMS radio resources or the usage state of the eMBMS radio resources and the range of the eMBMS radio resources forwarded by the MCE;

the procedure of the GCSE AS adjusting the scheduling of services transported on the eMBMS radio resources may include: the GCSE AS selecting one or multiple eMBMS bearers from the MBSFN area when determining the eMBMS radio resources are overloaded according to the actual usage condition of the eMBMS radio resources or according to the usage state of the eMBMS radio resources, establishing a unicast channel for transporting a GCSE service transported in the one or multiple eMBMS bearers, and informing the BM-SC to release the one or multiple eMBMS bearers.

In an example, when determining the eMBMS radio resources are overloaded according to the actual usage condition of the eMBMS radio resources sent by the eNB, the MCE selects one or multiple eMBMS bearers from an MBSFN area, and forwards an overload indication and a TMGI of the one or multiple eMBMS bearer selected when forwarding the usage information of the eMBMS radio resources; or when determining the eMBMS radio resources are overloaded according to usage information of the eMBMS radio resources sent by the eNB, the MCE forwards an overload indication and an overload range information when forwarding the usage information of the eMBMS radio resources.

In an example, the usage information of the eMBMS radio resources sent by the BM-SC may include: an overload indication and a TMGI of the eMBMS bearer forwarded by the MCE, or an overload indication and a TMGI of one or multiple eMBMS bearers selected from the overload range information forwarded by the MCE;

the procedure of the GCSE AS adjusting the scheduling of services transported on the eMBMS radio resources may include: establishing a unicast channel for transporting a GCSE service corresponding to an eMBMS bearer identified by the TMGI sent by the BM-SC, and informing the BM-SC to release the eMBMS bearer.

In an example, the usage information of the eMBMS radio resources sent by the eNB may include: actual usage condition of radio resources of each MCH in an MBSFN.

In an example, the method may also include: the MCE informs the eNB of the identity of each MCH; the actual usage condition of the eMBMS radio resources sent by the eNB includes the identity of each MCH and the actual usage condition of radio resources of each MCH; or actual usage condition of radio resources of MCHs sent by the eNB are arranged in the order of configuration information of the MCHs arranged in a configuration and scheduling message; or the actual usage condition of the eMBMS radio resources sent by the eNB may include usage condition of each MCH and a TMGI of a specific eMBMS bearer or TMGIs of all of eMBMS bearers that reuse the MCH.

In an example, when forwarding the usage information of the eMBMS radio resources, the MCE forwards actual usage condition of radio resources of each MCH sent by the eNB, or forwards a usage state of the eMBMS radio resources determined according to the actual usage condition of radio resources of each MCH;

the usage information of the eMBMS radio resources sent by the BM-SC may include: the actual usage condition of radio resources of each MCH or the usage state of the eMBMS radio resources forwarded by the MCE;

the procedure of the GCSE AS adjusting the scheduling of services transported on the eMBMS radio resources may include: the GCSE AS selecting one or multiple eMBMS bearers from a range corresponding to the eMBMS radio resources when determining the eMBMS radio resources are overloaded according to the actual usage condition of the radio resources of each MCH or according to the usage state of the eMBMS radio resources, establishing a unicast channel for transporting a GCSE service transported in the one or multiple eMBMS bearers, and informing the BM-SC to release the one or multiple eMBMS bearers.

In an example, when determining the eMBMS radio resources are overloaded according to the actual usage condition of radio resources of each MCH sent by the eNB, the MCE selects one or multiple eMBMS bearers from all eMBMS bearers reusing the MCH, and forwards an overload indication and a TMGI of the one or multiple eMBMS bearer selected when forwarding the usage information of the eMBMS radio resources; or when determining the eMBMS radio resources are overloaded according to usage information of radio resources of each MCH sent by the eNB, the MCE forwards an overload indication and an overload range information when forwarding the usage information of the eMBMS radio resources.

In an example, the usage information of the eMBMS radio resources sent by the BM-SC may include: an overload indication and a TMGI of the eMBMS bearer forwarded by the MCE, or an overload indication and a TMGI of one or multiple eMBMS bearers selected from the overload range information forwarded by the MCE;

the procedure of the GCSE AS adjusting the scheduling of services transported on the eMBMS radio resources may include: establishing a unicast channel for transporting a GCSE service corresponding to an eMBMS bearer identified by the TMGI sent by the BM-SC, and informing the BM-SC to release the eMBMS bearer.

In an example, if the actual usage condition of the eMBMS radio resources received by the MCE indicates fully loaded or if the MCE determines the eMBMS radio resources are fully loaded according to received usage information of radio resources of each MCH, the MCE forwards an overload indication and an MBSFN area corresponding to the eMBMS radio resources when forwarding the usage information of the eMBMS radio resources;

the usage information of the eMBMS radio resources sent by the BM-SC may include: an indication indicating the eMBMS radio resources are fully loaded forwarded by the MCE and an MBSFN area corresponding to the eMBMS radio resources;

the procedure of the GCSE AS adjusting the services transported on the eMBMS radio resources may include: after receiving the indication indicating the eMBMS radio resources are fully loaded and in response to a determination that there is to-be-transmitted data of a GCSE service on the eMBMS radio resources, the GCSE AS delays transmission of the to-be-transmitted data for a pre-defined length of time, or the GCSE AS selects one or multiple eMBMS bearers from the MBSFN area and establishing a unicast channel for transporting a GCSE service transported on the selected one or multiple eMBMS bearers.

In an example, the actual usage condition of radio resources may include: a resource usage level, or a percentage value of actually in-use radio resources in allocated resources, or a percentage value of idle radio resources in allocated resources, or the amount of actually transmitted data, or the amount of data that can be transported using the radio resources.

In an example, the method may also include: the MCE selects an eNB in an MBSFN area, and configures the eNB to send usage information of eMBMS radio resources in the MBSFN area.

In an example, the usage information of the eMBMS radio resources sent by the eNB may include an indication indicating there is a failure or an error in the eNB, an identity of the eNB, or an SAI of the eNB or a TMGI of an eMBMS bearer affected by the failure or the error.

In an example, the usage information of the eMBMS radio resources sent by the BM-SC may include an indication indicating there is a failure or an error in the eNB, an identity of the eNB, or an SAI of the eNB or a TMGI of an eMBMS bearer affected by the failure or the error;

the procedure of the GCSE AS adjusting the scheduling of a service transported using the eMBMS radio resources may include: the GCSE AS establishing a unicast channel for transporting a GCSE service that is transmitted using the eMBMS bearers affected by the failure or the error or the eMBMS bearers in the serving area of the eNB, and informing the BM-SC to release the eMBMS bearers.

In an example, the usage information of the eMBMS radio resources sent by the eNB may include: overload recovery information, or a failure or error recovery information, and an SAI or an identity of the eNB;

the procedure of the GCSE AS adjusting the scheduling of the service transported using the eMBMS radio resources may include: the GCSE AS selects a GCSE service from the SAI area or from a service area of the eNB, and transmits the GCSE service using the eMBMS bearer; or the GCSE AS increases transmission range of the eMBMS bearer, changes a service area of the eMBMS, and informs the BM-SC to perform an update.

A method for radio resources management may include: receiving, by a UE, information indicating eMBMS radio resources are overloaded sent by an eNB, the information includes a TMGI of an eMBMS bearer to which discarded data belongs;

sending, by the UE, a request to a GCSE AS, establishing a unicast channel for transmitting downlink data of a GCSE service transported using the eMBMS bearer.

A method for radio resources management may include: receiving, by a UE, control information sent by an eNB, the control information is determined by the eNB according to scheduling information configured by an MCE; the scheduling information is configured by the MCE when a new eMBMS bearer occupies radio resources of an established eMBMS bearer, the scheduling information includes information of the new eMBMS bearer and no information of the eMBMS bearer whose radio resources are occupied by the new eMBMS bearer;

after determining the control information includes no information of the eMBMS bearer whose radio resources are occupied by the new eMBMS bearer, requesting, by the UE, to establish a unicast channel for transmitting a GCSE service transported using the eMBMS bearer whose radio resources are occupied by the new eMBMS bearer in response to a determination that the UE needs to receive the GCSE service.

A method for radio resources management may include: receiving, by a GCSE AS, a resource state report message sent by an MCE via a BM-SC, the message includes information indicating radio resources of an established eMBMS bearer are occupied by a new eMBMS bearer and a TMGI of the established eMBMS bearer;

terminating, by the GCSE AS, the GCSE service transported on the established eMBMS bearer according to the resource state report message, and informing the BM-SC to release the established eMBMS bearer.

In an example, the method may also include: the GCSE AS establishes a unicast channel for transporting the GCSE service transported on the established eMBMS bearer according to the resource state report message.

An apparatus for radio resources management may include a reception module and a re-configuration module;
the reception module is configured to receive usage information of eMBMS radio resources sent by the eNB, and forward the usage information to the re-configuration module;
the re-configuration module is configured to re-configure the eMBMS radio resources to eliminate an overloaded state in response to a determination the eMBMS radio resources are in the overloaded state according to the usage information of the eMBMS radio resources.

An apparatus for radio resources management may include a reception module and a scheduling module;
the reception module is configured to receive usage information of eMBMS radio resources sent by a BM-SC; the usage information of the eMBMS radio resources is determined by the BM-SC according to usage information of the eMBMS radio resources sent by an eNB via an MCE;
the scheduling module is configured to adjust scheduling of a service transported using the eMBMS radio resources according to the usage information of the eMBMS radio resources.

An apparatus for radio resources management may include a reception module and a bearer setup module;
the reception module is configured to receive information sent by an eNB indicating eMBMS radio resources are overloaded, forward the information to the bearer setup module; the information includes a TMGI of an eMBMS bearer to which discarded data belongs;
the bearer setup module is configured to send a request to a GCSE AS, establish a unicast channel for transmitting downlink data of a GCSE service transported using the eMBMS bearer.

An apparatus for radio resources management may include a reception module and a bearer setup module;
the reception module is configured to receive control information sent by an eNB, and forward the control information to the bearer setup module; the control information is determined by the eNB according to scheduling information configured by an MCE; the scheduling information is configured by the MCE when a new eMBMS bearer occupies radio resources of an established eMBMS bearer, the scheduling information includes information of the new eMBMS bearer and no information of the established eMBMS bearer whose radio resources are occupied by the new eMBMS bearer;
the bearer setup module is configured to request, by the UE, to establish a unicast channel for transmitting a GCSE service transported using the established eMBMS bearer in response to a determination that the UE needs to receive the GCSE service after determining the control information includes no information of the established eMBMS bearer.

An apparatus for radio resources management may include a reception module and a processing module;
the reception module is configured to receive a resource state report message sent by an MCE via a BM-SC, the message includes information indicating radio resources of an established eMBMS bearer are occupied by a new eMBMS bearer and a TMGI of the established eMBMS bearer;
the processing module is configured to terminate transporting the GCSE service using the established eMBMS bearer according to the resource state report message, and inform the BM-SC to release the established eMBMS bearer.

According to the above technical mechanism, an MCE or a GCSE AS or a UE receives usage information of eMBMS radio resources sent by an eNB, adjusts the radio resources in response to a determination that the eMBMS radio resources are overloaded. The MCE may re-configure the eMBMS radio resources, or the UE or the GCSE AS may establish a unicast channel to transmit service data of a GCSE service transported on the eMBMS bearer, and release the eMBMS bearer. The technical mechanism can make effective use of radio interface resources and reduce data loss. Furthermore, as to the reporting the usage information of eMBMS radio resources by the eNB, it may be configured that only one eNB within an MBSFN area reports the usage information to reduce signaling overhead and data transmission of network interfaces.

DETAILED DESCRIPTION

In order to make the objectives, technical schemes and merits of the present invention clearer, a detailed description of the present invention is hereinafter given with reference to specific embodiments.

Figure 1:
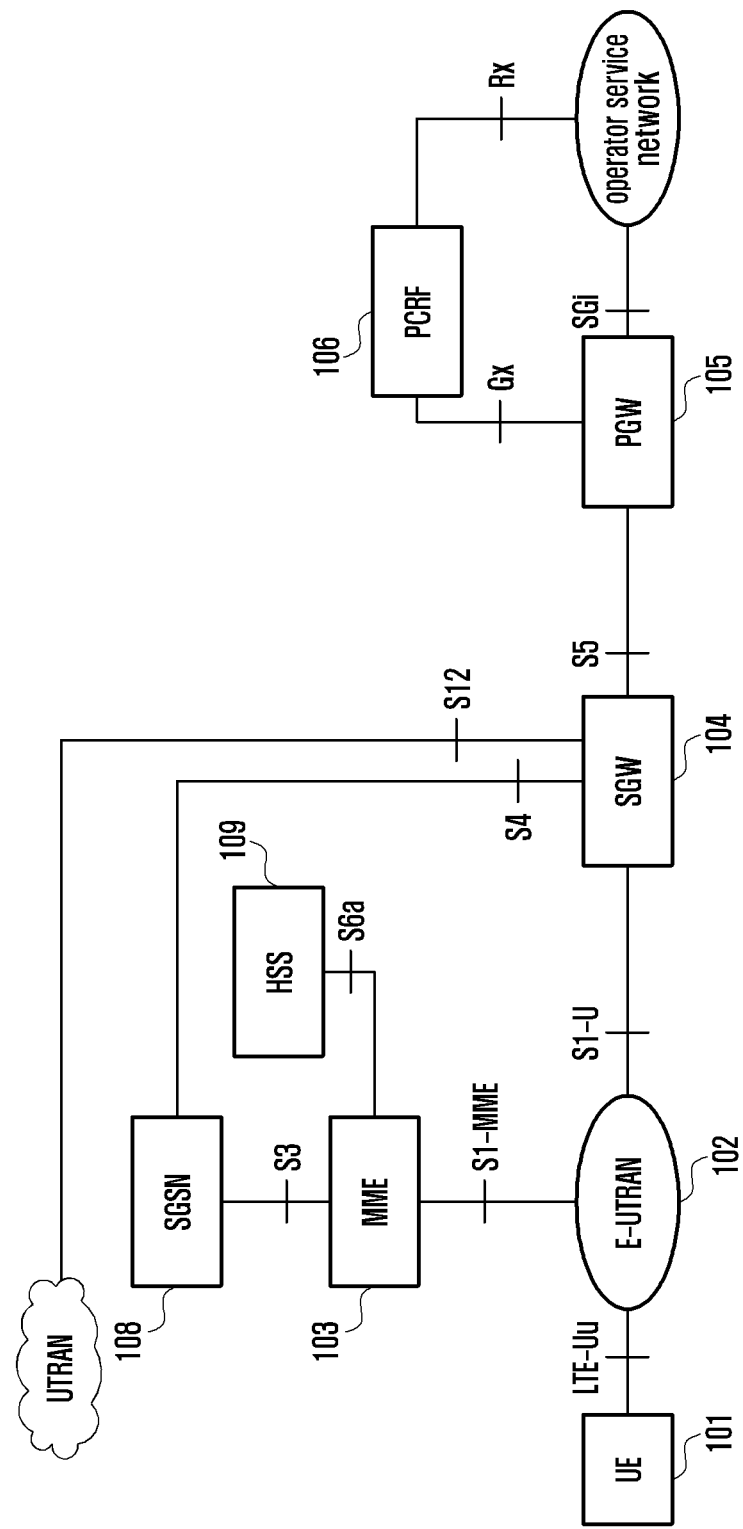
FIG. 1 is a schematic diagram illustrating a conventional SAE system.
Figure 2:
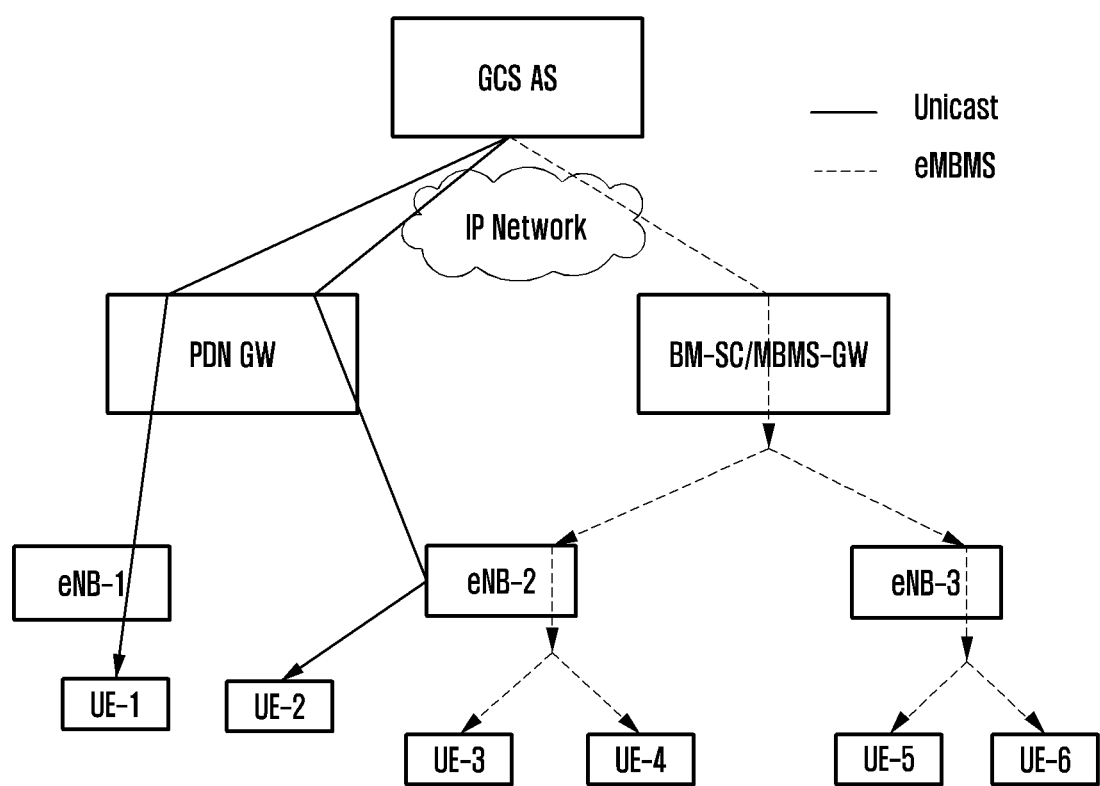
FIG. 2 is a schematic diagram illustrating a GCSE structure.
Figure 3:
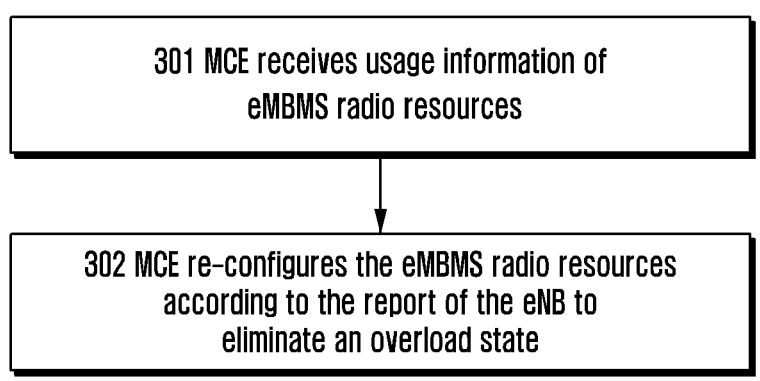
FIG. 3 is a flowchart illustrating a method for radio resources management in accordance with an example of the present disclosure.

According to an example, a GCSE server or an MCE or a UE receives information reported by a wireless access point, and decides the bearer for transporting GCSE data. The method of examples can reduce data loss resulted from a change in the data bearer, reduce the delay in establishment of a data bearer, effectively use radio interface resources, and reduce UE power consumption. FIG. 3 is a flowchart illustrating a method for radio resources management in accordance with an example of the present disclosure. As shown in FIG. 3, the method may include the following procedures.

At block 301, an MCE receives usage information of eMBMS radio resources sent by an eNB.

At block 302, the MCE re-configures the eMBMS resources according to the report from the eNB to eliminate an overloaded state.

Figure 4:
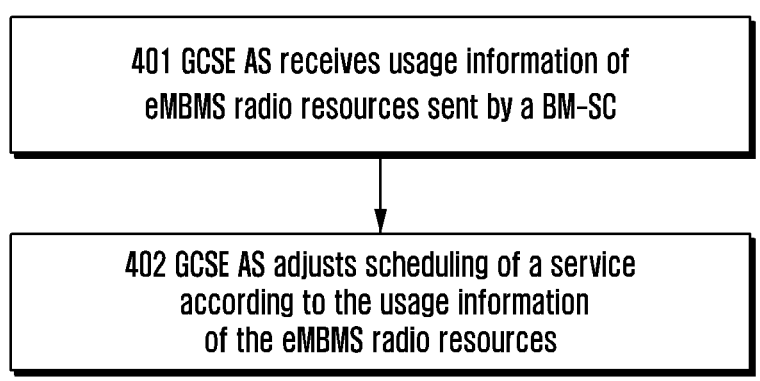
FIG. 4 is a flowchart illustrating a method for radio resources management in accordance with an example of the present disclosure.

FIG. 4 is a flowchart illustrating a method for radio resources management in accordance with an example of the present disclosure. As shown in FIG. 4, the method may include the following procedures.

At block 401, a GCSE AS receives usage information of eMBMS radio resources sent by a BM-SC.

The usage information of the eMBMS radio resources sent by the BM-SC is determined based on usage information of the eMBMS radio resources sent by an eNB via an MCE. In an example, the BM-SC may directly forward the usage information of the eMBMS radio resources sent by the MCE, or determine further information based on the usage information sent by the MCE and send the further information to the GCSE AS.

At block 402, the GCSE AS adjusts scheduling of a service transported using the eMBMS radio resources according to the usage information of the eMBMS radio resources.

The usage information of the eMBMS radio resources may be one or multiple of the following:
1: radio resources are overloaded;
2: condition of radio resources usage;
3: usage information of radio resources of a certain transmission channel;
4: information indicating an error occurred in an eNB;
5: the eNB has eliminated the overloaded state or has recovered from a failure.

According to the above methods, through re-configuration of the eMBMS radio resources by the MCE or through adjusting the scheduling of a GCSE service by the GCSE AS, data loss in case of a failure or an error of an eNB resulted from an overloaded bearer can be reduced, and situations when GCSE service data exceeds the transmission capacity of radio resources can be avoided.

The above methods are described in further detail with reference to several examples (examples 1-3 and 7-8). The processes are implemented through interactions between physical entities. The two methods both need an eNB to report usage information of eMBMS radio resources to an MCE and the report procedure is the same in the two methods. Thus the two methods are described in the same example.

Example 1

Figure 5:
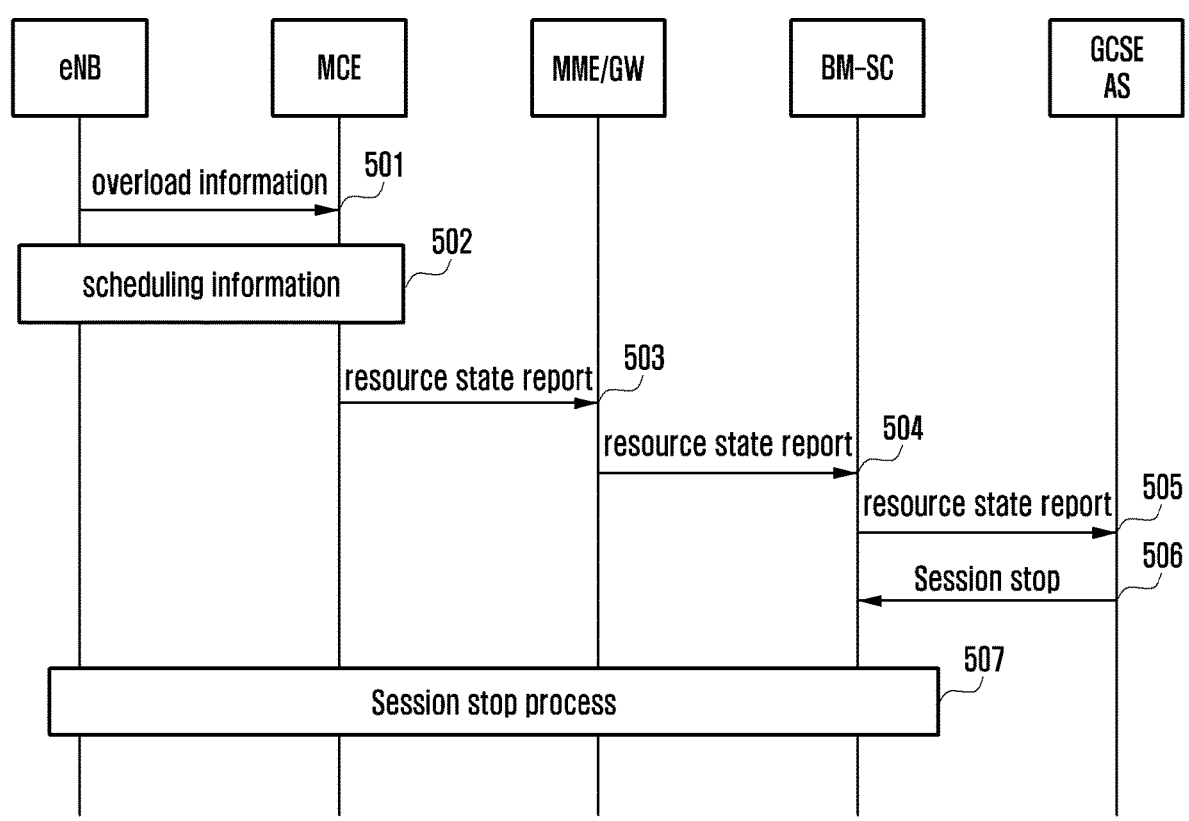
FIG. 5 is a flowchart illustrating a method in accordance with the an example of the present disclosure.

In this example, the usage information of eMBMS radio resources reported by an eNB is information indicating an overload state. The eNB sends the overload information to an MCE. The MCE may send the overload information to a GCSE AS via a core network. The GCSE AS may send some of GCSE services using unicast bearers as in the method shown in FIG. 4. Alternatively, the MCE may re-allocate MBMS radio resources to eliminate the overloaded state of the eNB as in the method shown in FIG. 3. FIG. 5 is a flowchart illustrating a detailed process of example 1. The process may include the following procedures.

At block 501, an eNB report an overload indication (notification) to an MCE.

The eNB get the knowledge that radio resources corresponding to an eMBMS bearer are allocated to the eNB from a scheduling information message sent by the MCE. According to conventional mechanisms, multiple transmission channels MCH may share the radio resources, and multiple eMBMS bearers may be multiplexed in one MCH, and the order of the multiplexing is configured in the scheduling information. An eMBMS bearer is uniquely identified by a TMGI.

The eNB receives data from an MBMG-GW, and sends the data using the eMBMS radio resources according to the above multiplexing rule. When there is a sudden increase in the amount of data transmitted on an eMBMS bearer and the increased data is beyond the transmission capacity of the MCH, the eNB discards data packets that are the last data packets multiplexed on to the eMBMS bearer.

When the eNB discards data packets, it means the radio resources are not enough to transport all of the data, and the eNB report the overload indication to the MCE. Radio resources are configured for an MBSFN, an eNB may cover multiple MBSFNs, and different MBSFNs may have different resource usage conditions. Therefore, the message may include the identity of the MBSFN corresponding to the overloaded radio resources.

The overload indication may be implemented in different manners.

In an example, the eNB reports the overload indication without specifying the transmission channel that is overloaded. The message in block 501 may include information specifying an MBSFN area and an overload indication. The overload indication may be represented by the name of the message or an information element included in the message.

According to another example, the eNB reports overload information of a transmission channel. The message in block 501 may include information specifying an MBSFN area, an identity of an MCH and an overload indication. The overload indication may be represented by the name of the message or an information element included in the message. The conventional message used by an MCE for configuring scheduling information of eMBMS radio resources does not include the identity of an MCH. The identity of an MCH may be specified in the message explicitly, or via the order of the MCH being configured by the MCE in the scheduling information, for example, the first configured MCH is denoted as 1, and the second configured MCH is denoted as 2, and so on.

In yet another example, the eNB reports the eMBMS bearer that is overloaded in the transmission channel. The message in block 501 may include an identity of a TMGI and an overload indication. The overload indication may be represented by the name of the message or an information element included in the message. According to conventional mechanisms of discarding packets by MBMS eNBs, when an MBMS GW transmits a data packet that is beyond the transmission capacity of radio resources of an MCH, the eNB always discards data packets in the last eMBMS bearer according to the multiplex order configured. For example, supposing TMGI1 and TMGI2 reuse MCH1 and a sudden increase of data occurs in TMGI1, the eNB has to transmit data packets of TMGI1 and discard data packets of TMGI2. Further, all eNBs in an MBSFN have to transmit the same data simultaneously. Therefore, all the eNBs are required to adopt the same rule, and report the same identity of the service of the eMBMS bearer in case of an overload. For example, the eNB may report the identity of the bearer which has packet loss or report the identity of the bearer that has the largest amount of data. But it is required that all eNBs report the same information.

After an eNB reports the overload indication, the MCE may have two processing manners respectively as shown in FIG. 3 and FIG. 4.

The MCE may re-configure radio resources for the eMBMS service in response to the overload indication, that is, to perform the procedure in block 502 as shown in FIG. 3.

Alternatively, the MCE may perform the procedure in block 503 and subsequent procedures shown in FIG. 4. The MCE may send the information indicating the overload to a GCSE AS via a core network of the LTE system. Since information provided by the overload indication is insufficient or the MCE does not have extra radio resources to allocate to the eMBMS, the MCE may inform the overload situation to a BM-SC and a GCSE AS. The BM-SC may select one or multiple eMBMS bearers and send the overload indication and TMGIs of the eMBMS bearers to the GCSE AS. Alternatively, the BM-SC may only send the overload indication to the GCSE AS, and the GCSE AS selects one or multiple eMBMS bearers and transmits GCSE services on the selected eMBMS bearers in unicast channels. Then the GCSE AS initiates a process to release the eMBMS bearers to reduce data transmitted through eMBMS radio resources and eliminate the overloaded state of the radio resources. Alternatively, the MCE may check eMBMS services being transmitted, select one or multiple MBMS services, send identities of the MBMS services together with the overload indication to the GCSE AS via the core network of the LTE system.

At block 502, the MCE schedules the eMBMS radio resources.

After receiving the message sent in block 501, the MCE may choose to configure more radio resources for the eMBMS. Alternatively, if the MCE have information of the overloaded MCH, the MCE may allocate more resources to the MCH while reducing radio resources of other MCHs (that is, those MCHs that are not overloaded).

At block 503, the MCE sends a message to the core network, the message includes information indicating the overload.

The information indicating the overload may be represented by the name of the message or an information element included in the message.

The message may also include one of the following information items.

1: TMGI of a bearer. The identity may be the TMGI sent by the eNB in block 501, or one or multiple TMGIs selected by the MCE based on configuration of the MBSFN area which includes QoS information of the eMBMS bearer. The TMGI may be sent to the LTE core network via the message in block 503. The core network may include an MME and an MBMS GW. The message is first sent to the MME, and the MME forwards the message to the MBMS GW.

2: The range of the overload. The range of the overload may be an identity of an MBSFN, or an identity of a service area of the eNB.

At block 504, the core network sends the message to the BM-SC. The message in block 503 is forwarded.

At block 505, the BM-SC sends a message to the GCSE AS. The message may include information indicating the overload.

The information indicating the overload may be represented by the name of the message or an information element included in the message.

The message may also include the following information items.

1: TMGI of a bearer. The identity may be the TMGI sent by the MCE in block 503, or one or multiple TMGIs selected by the BM-SC based on the range of the overload which includes QoS information of the eMBMS bearer.

2: The range of the overload. The information may be the range of the overload sent by the MCE in block 503.

At block 506, the GCSE AS establishes a unicast channel for transporting a GCSE service corresponding to the TMGI sent by the BM-SC. The process is the same with that in conventional mechanisms. Alternatively, the GCSE AS may select one or multiple eMBMS bearers according to the range of the overload sent by the BM-SC, and establish a unicast channel for transporting a GCSE service on the eMBMS bearers. Since the GCSE service is transmitted in unicast bearers, there is no need to retain the eMBMS bearers corresponding to the GCSE services. The GCSE AS may send a message to the BM-SC to release the eMBMS bearers.

At block 507, the BM-SC initiates an eMBMS session termination process, and sends a session stop message to MCE via the core network. The MCE schedules the eNB to release the eMBMS radio resources. The process is the same with that in conventional mechanisms. The process is not described further herein.

Example 2

Figure 6:
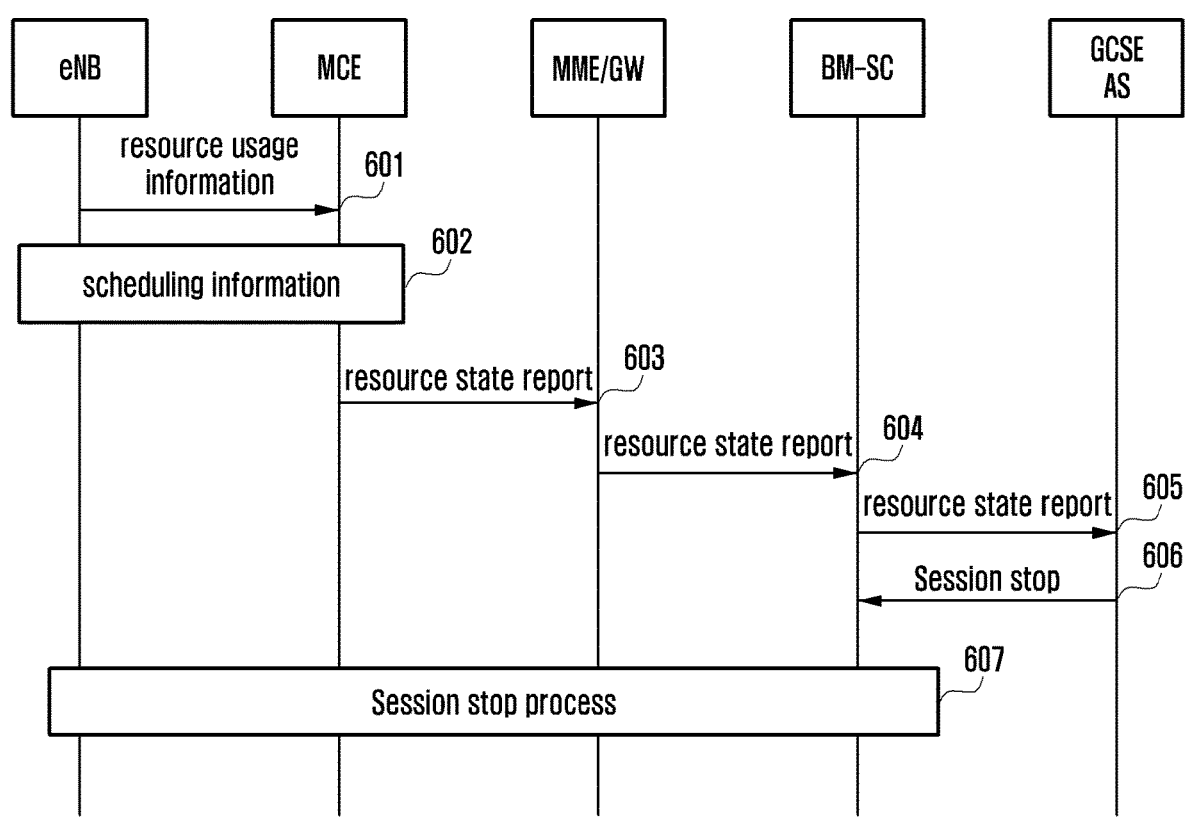
FIG. 6 is a flowchart illustrating a method in accordance with an example of the present disclosure.

In this example, the usage information of eMBMS radio resources reported by an eNB includes actual usage condition of the eMBMS radio resources. The eNB reports the actual usage condition of the eMBMS radio resources to the MCE, and the MCE sends the actual usage condition to a GCSE AS via a core network. The GCSE AS may send some of GCSE services using unicast bearers as in the method shown in FIG. 4. Alternatively, the MCE may re-configure MBMS radio resources according to the usage information of the radio resources to eliminate the overloaded state of the eNB as in the method shown in FIG. 3. FIG. 6 is a flowchart illustrating a detailed process of example 2. The process may include the following procedures.

At block 601, an eNB reports actual usage condition of eMBMS radio resources to the MCE.

The message of block 601 may include actual usage condition of eMBMS radio resources. Radio resources are configured for an MBSFN, an eNB may cover multiple MBSFNs, and different MBSFNs may have different resource usage conditions. Therefore, the message may include the identity of the MBSFN corresponding to the radio resources. An MBSFN corresponds to a set of service areas, thus can be represented using a list of service areas.

The actual usage condition of the radio resources may be a resource usage level. For example, there may be three resource usage levels, for example, high, medium, low, or overload, full-load and allow-more-load. Full-load means no more eMBMS bearers should be allocated to the current eMBMS radio resources. Alternatively, there may be two levels, for example, overload and full-load. Overload means no more eMBMS bearers should be allocated to the current eMBMS radio resources. There may be only one level. The eNB may indicate the radio resources are fully loaded. Fully loaded means no more eMBMS bearers should be allocated to the current eMBMS radio resources.

The actual usage condition of the eMBMS radio resources may also be a percentage value of actually in-use resources in allocated resources, or a percentage value of idle resources in allocated resources, or the amount of data actually transmitted, for example, the number of bytes transmitted within a defined cyclic time period, or the amount of data that can be transmitted using idle radio resources, for example, the number of bytes that can be transmitted within a defined cyclic time period. The idle resources are available radio resources, and can transmit more MBMS service data. If there are no idle resources, it means the eMBMS radio resources may not transmit more data.

After an eNB reports the actual usage condition of the eMBMS radio resources, the MCE may have two processing manners respectively as shown in FIG. 3 and FIG. 4.

The MCE may re-configure eMBMS radio resources based on the actual usage condition as in the method shown in FIG. 3, that is, performing the procedure in block 602.

Alternatively, the MCE may perform the procedure in block 603 and subsequent procedures shown in FIG. 4. The MCE may send the information indicating the overload to a GCSE AS via a core network of the LTE system.

At block 602, the MCE configures the eMBMS radio resources.

After receiving the message sent in block 601, the MCE may choose to configure more radio resources for the eMBMS. Since the information reported in block 601 is for radio resources of the whole eMBMS bearer, if multiple MCHs reuse the eMBMS bearer and the usage information indicates an overload state, the MCE does not know resource usage condition of each MCH, and has to adjust radio resources of the whole eMBMS bearer, for example, allocate more radio resources to the eMBMS, to eliminate the overload state. If the actual usage condition is full-load or overload, after receiving a session start message sent by an MME for a new eMBMS bearer, the MCE may send a session setup failure message to the MME. If the actual usage condition is allow-more-bearers, the MCE may accept a new session start message.

If the actual usage condition of the eMBMS radio resources reported by the eNB is a percentage value of used resources in allocated resources or a percentage value of idle resources in allocated resources, the MCE may perform resource re-allocation according to the percentage value. The MCE may determine usage condition of the eMBMS radio resources in the eNB. The method of making the determination may include deciding the usage condition using plural pre-defined thresholds. For example, if the percentage of in-use resources is high (or the percentage of idle resources is low) enough to reach an overload threshold, the MCE decides the eMBMS radio resources are overloaded in the eNB. A determination that the eMBMS radio resources are fully loaded or the like can be made in a similar manner. The MCE may perform different actions based on different actual usage conditions of the radio resources in the eNB.

At block 603, the MCE sends a message to a core network. The message may include information of actual usage condition of the radio resources.

The actual usage condition of the radio resources may be the actual usage condition of the eMBMS radio resources in the message received by the MCE in block 601, or may include one or multiple of the following information items based on the message in block 601.

1: TMGI of a bearer. If the actual usage condition of the eMBMS radio resources in the eNB is overload, the MCE may select one or multiple TMGIs. The selection may be made based on the QoS of the service. The TMGIs is sent together with an overload indication.
2: The range of the overload. If the actual usage condition of the eMBMS radio resources in the eNB is overload, the range of the overload may be an identity of an MBSFN or an identity of a service area.
3: A usage state of the radio resources, which may be one of multiple levels, for example, overload, full-load (that is, incapable of accepting more services), and available (that is, capable of accepting more services). The usage state may otherwise be a percentage of actually-in-use resources in allocated resources, or may be information in other forms. The usage state of the radio resource may be obtained in the manner as described in block 602 or in other manners. The usage state may include a range corresponding to the radio resources, for example, a list of service areas.
4: An overload indication, informing the GCSE AS that no more data should be scheduled. The overload indication may also include a range of the radio resources, for example, an identity of a service area.

At block 604, the core network sends the message to the BM-SC. The message in block 603 is forwarded.

At block 605, the BM-SC sends a message to the GCSE AS.

After receiving the actual usage condition of the radio resources sent by the MCE, the BM-SC may determine an overload state occurs based on the actual usage condition, and include the information indicating the overload into the message.

The information indicating the overload may be represented by the name of the message or an information element included in the message.

The message may also include the following information items.

1: TMGI of a bearer. The identity may be the TMGI sent by the MCE in block 603, or one or multiple TMGIs selected by the BM-SC based on the range of the overload which includes QoS information of the eMBMS bearer.
2: A usage state of the radio resources, which may be one of multiple levels, for example, overload, full-load (that is, incapable of accepting more services), and available (that is, capable of accepting more services). The usage state may otherwise be a percentage of actually-in-use resources in allocated resources, or may be information in other forms. The usage state may also include a range of the radio resources, for example, a list of service areas.

3: An overload indication, informing the GCSE AS that no more data should be scheduled. After receiving the indication, the GCSE AS may delay transmission of to-be-transmitted data for a time period or transmit the GCSE services in unicast bearers.

At block 606, the GCSE AS may establish a unicast channel for transporting a GCSE service corresponding to the TMGI sent by the BM-SC. The process is the same with that in conventional mechanisms. Alternatively, the GCSE AS may establish a unicast channel for transporting a GCSE service corresponding to one or multiple TMGIs if the usage state of the radio resources in block 605 indicates overload. The process of the establishment is the same with that in conventional mechanisms. If the usage state indicates full-load and there are more data waiting to be transmitted for the GCSE services, the GCSE AS may delay the transmission for a time period or establish unicast bearers for transmitting the GCSE services. Since the GCSE service is transmitted in unicast bearers, there is no need to retain the eMBMS bearers corresponding to the GCSE services. The GCSE AS may send a message to the BM-SC to release the eMBMS bearers.

At block 607, the BM-SC initiates an eMBMS session termination process, sends a session stop message to MCE via the core network. The MCE schedules the eNB to release the eMBMS radio resources. The process is the same with that in conventional mechanisms. The process is not described further herein.

Hence, the process of this example is completed.

Example 3

Figure 7:
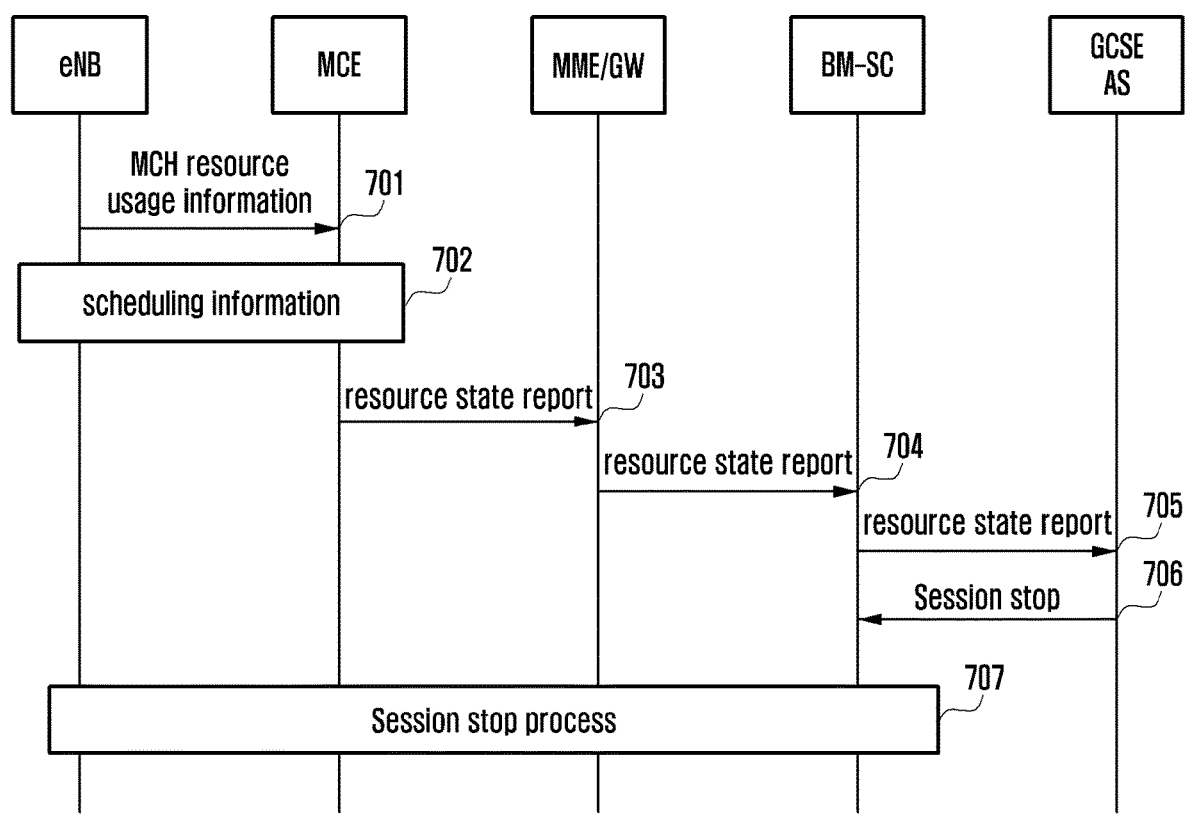
FIG. 7 is a flowchart illustrating a method in accordance with an example of the present disclosure.

In this example, the usage information of eMBMS radio resources reported by an eNB is radio resources usage information of each MCH or each TMGI within an MBSFN. The eNB reports usage information of the radio resources to the MCE, and the MCE sends the usage information to a GCSE AS via a core network. The GCSE AS may send some of GCSE services using unicast bearers as in the method shown in FIG. 4. Alternatively, the MCE may re-configure MBMS radio resources according to the usage information of the radio resources to eliminate the overloaded state of the eNB as in the method shown in FIG. 3. FIG. 7 is a flowchart illustrating a detailed process of example 3. The process may include the following procedures.

At block 701, an eNB reports usage information of an MCH to an MCE.

The message in block 701 may include an identity of an MCH and radio resources usage information of the MCH. Radio resources are configured for an MBSFN, an eNB may cover multiple MBSFNs, and different MBSFNs may have different resource usage conditions. Therefore, the message may include the identity of the MBSFN corresponding to the radio resources.

Conventional messages sent by an MCE for configuring scheduling information of eMBMS radio resources do not include an MCH identity. In an example, the message for configuring scheduling information may explicitly specify the identity of the MCH. Alternatively, in the message, the usage information is a list in which each element corresponds to an MCH, and the position of an MCH in the list is decided based on the order of the MCHs being configured in the message sent by the MCE for configuring scheduling information. For example, an MCH which is first configured is placed at the first position in the list of radio resources usage information, and an MCH which is second configured is placed at the second position in the list, and so on.

The message in block 701 may include an identity of an MCH and radio resources usage information of the MCH. Different transmission channels may have different actual usage conditions because the transmission channels may transport different MBMS services. The resources usage information reported may be a usage level. For example, there may be three levels (high, medium, low), or two levels. The resources usage information reported may be a percentage value of resources occupied for data transmission in allocated resources. A percentage value larger than 100% indicates to-be-transmitted data is beyond the transmission capacity of the previously allocated resources. The resources usage information may also be a percentage value of idle resources in allocated resources or an accurate value of the amount of used resources or idle resources. In other examples, the usage information of radio resources of an MCH may be represented in other manners.

For an example, suppose an MBSFN is configured with MCH1 and MCH2, TMGI1 and TMGI2 reuse MCH1, TMGI3 and TMGI4 reuse MCH2. Resources usage level of MCH1 is high, and resources usage level of MCH2 is medium. Radio resources allocated to MCH1 and MCH2 can transmit data of 100 bytes within a cyclic time period. TMGI1 and TMGI2 are to transmit data of 150 bytes within a cyclic time period, while TMGI3 and TMGI4 are to transmit data of 50 bytes within a cyclic time period. The report of the eNB may be in the form of the following table 1.

TABLE 1

| Name of information element | value |
|---|---|
| identity of MBSFN area | Area-1 |
| MCH ID | MCH1 |
| resources usage information | overload (or high, or 150%) |
| MCH ID | MCH2 |
| resources usage information | capable of bearing more services (or low, or 50%) |

In another example, the message may include no MCH ID. Instead, usage information of MCHs are arranged according to an order that is the same with the order of MCHs in the message sent by the MCE for configuring scheduling information of the eNB. The report of the eNB may be in the form of the following table 2. List element 1 corresponds to the MCH which is first configured in a PMCH configuration list in a message for configuring scheduling information of the eNB.

TABLE 2

| Name of information element | value |
|---|---|
| identity of MBSFN area | Area-1 |
| MCH resources usage information list | |
| resources usage information | list element 1: overload (or high, or 150%) |
| | list element 2: capable of bearing more services (or low, or 50%) |

Conventional messages sent by an MCE for configuring scheduling information of eMBMS radio resources do not include an MCH identity, but configures a TMGI which is the identity of an eMBMS bearer that reuses the MCH. The eNB does not record the MCH identity. Therefore, the MCH may be identified by the TMGI. For example, an MCH may be identified by the TMGI of the first eMBMS bearer that reuses the MCH, or by TMGIs of all eMBMS bearers that reuse the MCH.

According to the above example, the report sent by the eNB may be in the form of the following table 3.

TABLE 3

| Name of information element | value |
|---|---|
| identity of MBSFN area | Area-1 |
| TMGI | TMGI1 or/and TMGI2 |
| resources usage information | overload (or high, or 150%) |
| TMGI | TMGI3 or/and TMGI4 |
| resources usage information | capable of bearing more services (or low, or 50%) |

The MCE may re-configure eMBMS radio resources according to the resources usage information of the MCH, as in the method shown in FIG. 3.

Alternatively, the MCE may perform the procedure in block 703 and subsequent procedures shown in FIG. 4. The MCE may send the resources usage information of the MCH to a GCSE AS via a core network of the LTE system.

At block 702, the MCE configures the eMBMS radio resources.

After receiving the message sent in block 701, the MCE may choose to configure more radio resources for the eMBMS. The MCE has obtained resources usage information of each MCH according to the information of block 701, may not configure more radio resources but adjust the radio resources occupied by each MCH, for example, increasing available resources of an MCH which is overloaded, and reducing resources of an MCH which is not overloaded, so as to eliminate the overload state without allocating more eMBMS radio resources. In the example in block 701, the MCE may increase radio resources of MCH1 and reduce radio resources of MCH2 so that radio resources of MCH1 are enough to transmit data of TMGI1 and TMGI2 to UEs.

If each MCH is overloaded, the MCE may send a session setup failure message to an MME after receiving a session setup message sent by the MME for a new eMBMS bearer.

At block 703, the MCE sends a message to the core network. The message may include information of resources usage information of each MCH.

The resources usage information of an MCH may be the usage information of the eMBMS radio resources in the message received by the MCE in block 701, or may include one or multiple of the following information items based on the message in block 701.

1: TMGI of a bearer. If resources usage information of an MCH is overloaded in the eNB, the MCE may select one or multiple TMGIs from all eMBMS bearers that reuse the MCH. The MCE may be selected based on the QoS of the services.
  2: The range of the overload. If the resources usage information of an MCH in the eNB is overload, a GCSE service on the MCH may be selected, and the message may include an overload indication and the range of the overload corresponding to the selected GCSE service. The range of the overload may be an identity of an MBSFN area or an identity of a service area.
  3: Usage state of radio resources. The MCE may decide usage information of eMBMS radio resources according to the resources usage information of each MCH. The eMBMS radio resources usage information may be one of multiple levels, for example, overload, full-load (incapable of bearing more services), available (capable of bearing more services), or may be a percentage value of actually used resources in allocated resources, or may be in other forms. The usage information may also include the range of the radio resources, for example, an identity of a service area.
  4: Overload indication. The MCE may determine usage information of the eMBMS radio resources according to resources usage information of each MCH, informing the GCSE AS that no more data can be scheduled. The overload indication may also include a range of the radio resources, for example, an identity of a service area.

At block 704, the core network sends the message to the BM-SC. The message in block 703 is forwarded.

At block 705, the BM-SC sends a message to the GCSE AS.

After receiving the resources usage information sent by the MCE, the BM-SC may determine an overload state occurs based on the resources usage information, and include the overload indication into the message.

The overload indicating may be represented by the name of the message or by an information element included in the message.

The message may also include the following information items.

1: TMGI of a bearer. The identity may be the TMGI sent by the MCE in block 703, or one or multiple TMGIs selected by the BM-SC based on the range of the overload sent by the MCE which includes QoS information of the eMBMS bearer.
  2: A usage state of the radio resources sent by the MCE, which may be one of multiple levels, for example, overload, full-load (that is, incapable of bearing more services), and available (that is, capable of bearing more services). The usage state may otherwise be a percentage of actually-in-use resources in allocated resources, or may be information in other forms.
  3: An overload indication sent by the MCE, informing the GCSE AS that no more data should be scheduled. After receiving the indication, the GCSE AS may delay transmission of to-be-transmitted data for a time period or transmit the GCSE services in unicast bearers. The overload indication may also include a range of the radio resources, for example, an identity of a service area.

At block 706, the GCSE AS may establish a unicast channel for transporting a GCSE service corresponding to the TMGI sent by the BM-SC. The process is the same with that in conventional mechanisms. Alternatively, the GCSE AS may establish a unicast channel for transporting a GCSE service corresponding to one or multiple TMGIs within the range of the radio resources if the usage state of the radio resources in block 705 indicates overload. The process of the establishment is the same with that in conventional mechanisms. If the usage state indicates full-load and there are more data waiting to be transmitted for the GCSE services, the GCSE AS may delay the transmission for a time period or establish unicast bearers for transmitting the GCSE services. Since the GCSE service is transmitted in unicast bearers, there is no need to retain the eMBMS bearers corresponding to the GCSE services. The GCSE AS may send a message to the BM-SC to release the eMBMS bearers.

At block 707, the BM-SC initiates an eMBMS session termination process, sends a session stop message to MCE via the core network. The MCE schedules the eNB to release the eMBMS radio resources. The process is the same with that in conventional mechanisms. The process is not described further herein.

Hence, the process of this example is completed.

All eNBs within an MBSFN area are allocated with the same resources, and receive the same data from the same MBMS-GW. Therefore, all the eNBs have the same usage information of eMBMS radio resources, and transmit the same report of radio resources usage information. Signaling transmitted over M2 interfaces can be reduced by configuring only one eNB to transmit the report. Accordingly, an example provides a method of an eNB reporting radio resources usage information. The method may be used together with the method shown in FIG. 3 and FIG. 4, or may be used alone. In an example, the method may include: an MCE selects an eNB in an MBSFN area, and configures the eNB to send usage information of eMBMS radio resources in the MBSFN area. The configuration of the eNB may be implemented via an M2 setup response or a customized message sent by the MCE. The method is described in detail in examples 4 and 5.

Example 4

Figure 8:
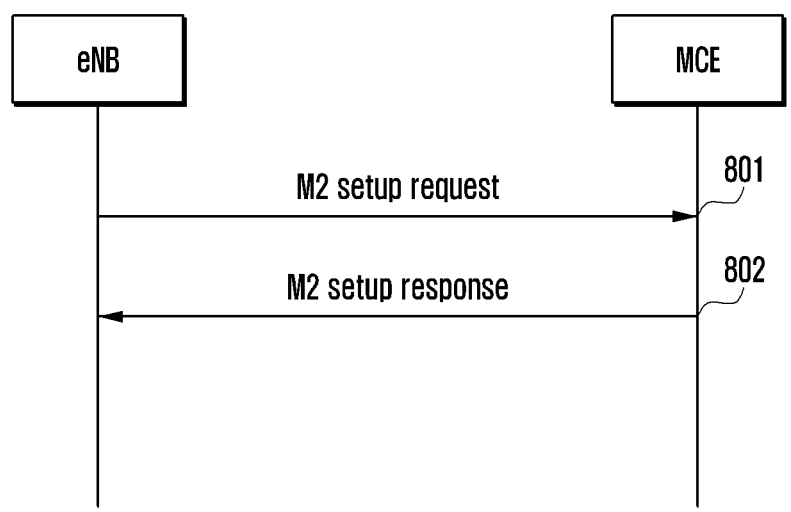
FIG. 8 is a flowchart illustrating a method in accordance with an example of the present disclosure.

FIG. 8 is a flowchart illustrating a method of an eNB reporting radio resources usage information. The method may include the following procedures.

At block 801, an eNB sends an M2 setup request to an MCE.

The M2 setup request may include configuration information of the eNB, for example, an eNB ID, an ECGI which is an identity of a cell of the eNB, a synchronous area identity of the cell and a service area identity (SAI).

At block 802, the MCE sends an M2 setup response to the eNB.

The M2 setup response may include the identity and the name of the MCE, and broadcast information in connection with an eMBMS control channel. The M2 setup response may also include an indication indicating whether the eNB or a cell in the eNB is required to report overload information or information about eMBMS radio resources.

The M2 setup response may also configure whether the report is to be periodically sent or sent in response to a trigger event. If the report is to be sent periodically, the response may also include configurations of the interval. If the report is to be sent in response to a trigger event, the response may also include configurations of a threshold of the trigger event.

Hence, the process of this example is completed.

Example 5

Figure 9:
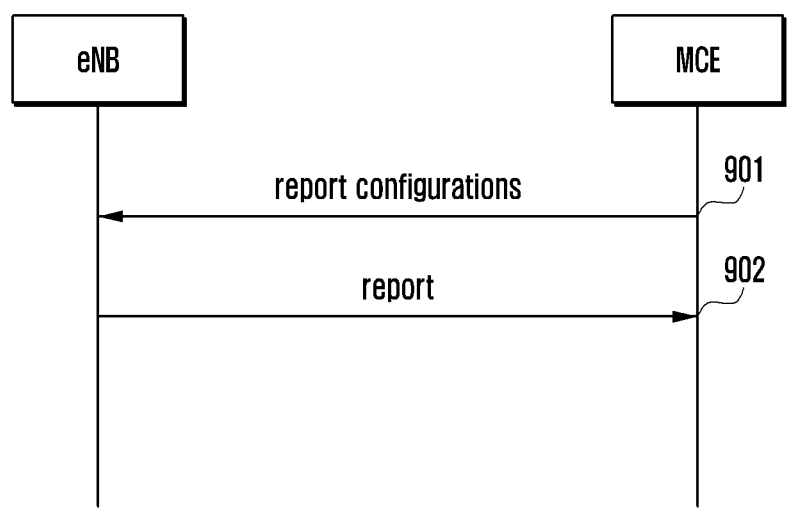
FIG. 9 is a flowchart illustrating a method in accordance with an example of the present disclosure.

FIG. 9 is a flowchart illustrating a method of an eNB reporting radio resources usage information. The method may include the following procedures.

At block 901, an MCE sends a report configuration message to an eNB.

The report configuration message may include an identity of an MBSFN area, information indicating whether the report is to be periodically sent or sent in response to a trigger event. If the report is to be sent periodically, the response may also include configurations of the interval. If the report is to be sent in response to a trigger event, the response may also include configurations of a threshold of the trigger event. The MCE selects an eNB within the MBSFN area for reporting radio resources usage information. The MCE sends the report configuration message to the eNB, and the eNB that receives the message transmits the report. The eNB may send a message to inform the MCE that the message of block 901 has been received. This procedure is for confirming the successful transmission of the message over the M2 interface. This procedure is not described.

At block 902, the eNB sends a report to the MCE.

The eNB transmits a report according to the configuration sent by the MCE. The eNB performs the report according to an interval or a threshold configured by the MCE.

Hence, the process of this example is completed.

Example 6

Figure 10:
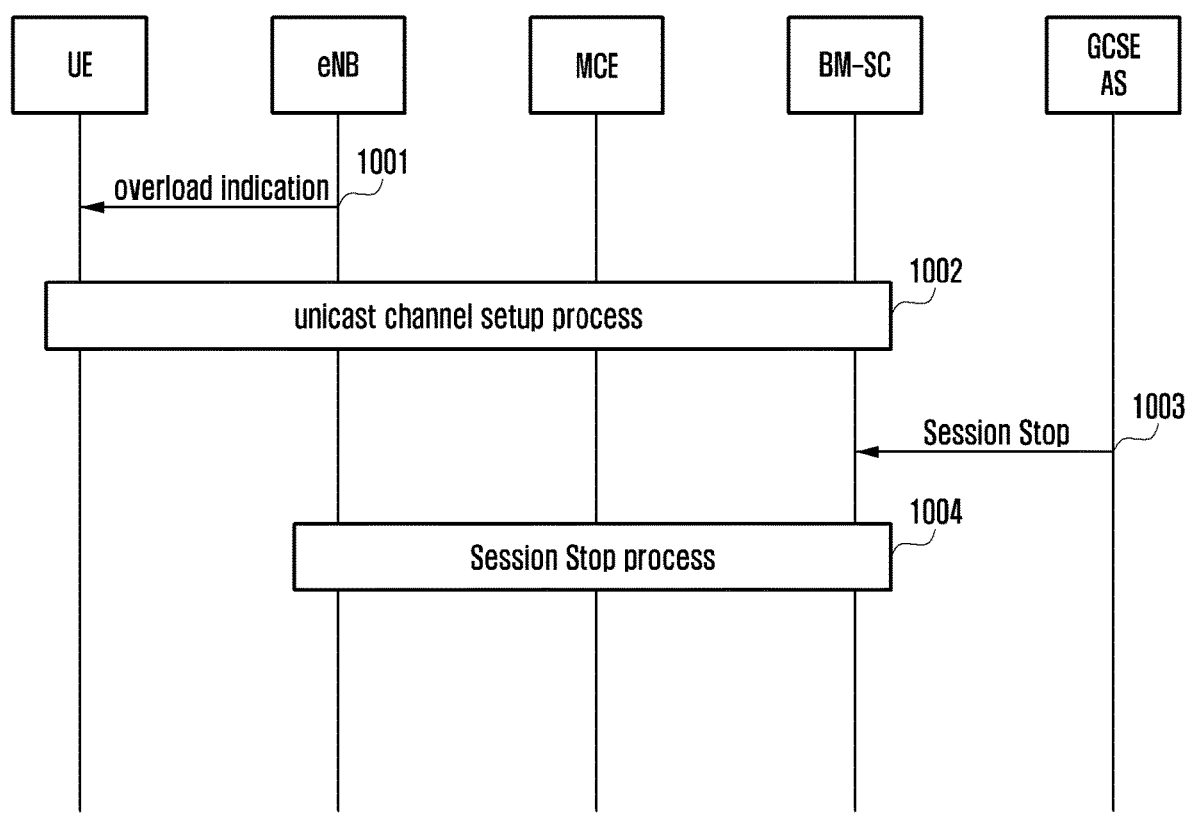
FIG. 10 is a flowchart illustrating a method in accordance with an example of the present disclosure.

This example describes an eNB sends a message to a UE instructing the UE to setup a unicast channel when eMBMS radio resources are overloaded. The method of this example is a third method for radio resources management. FIG. 10 is a flowchart of the method of this example. This example also describes the process through description of interactions between entities. The process may include the following procedures.

At block 1001, an eNB sends a message indicating eMBMS radio resources are overloaded to an MCE.

The eNB finds out that the eMBMS radio resources are not enough to transmit all data sent by an MBMS GW to UEs, and data on an eMBMS bearer is discarded. The eNB sends a message indicating the radio resources are overloaded via a control channel of the eMBMS bearer. The message may include a TMGI which is an identity of the eMBMS bearer.

At block 1002, the UE initiates a process to establish a unicast channel.

The UE gets information about GCSE service transmitted in the TMGI according to information stored in the UE, and actively sends a request to establish a unicast channel for transmitting downlink data of the GCSE service. The process is the same with conventional process, and is not described.

Hence, the process of the third method is completed. Further, the following procedures may be carried out to release the eMBMS bearer.

At block 1003, the GCSE AS sends a session stop request to a BM-SC.

The GCSE AS has information that the service is provided through a unicast channel without using the eMBMS bearer, identifies the eMBMS bearer corresponding to the service, and sends a session stop message to the BM-SC.

At block 1004, the BM-SC initiates a session stop process.

In order to make eNBs within an MBSFN area act in consistency, it is necessary to configure the eNBs situations when the eNBs is required to send the message in block 901 to the UE. According to a configuration method, the information is pre-configured in a UE via operations, administration and management (OAM), for example, it may be configured that when packet loss of a service identified by a TMGI exceeds 20%, the eNB is required to inform the UE. Alternatively, the information may be configured by an MCE in the eNB. The configuration process is described in block 801 in example 8, the configuration information includes conditions or a threshold for an eNB sending an overload indication to a UE. For example, it may be configured that when a service has a packet loss of over 20%, the eNB should inform the UE.

Hence, the process of this example is completed.

Example 7

Figure 11:
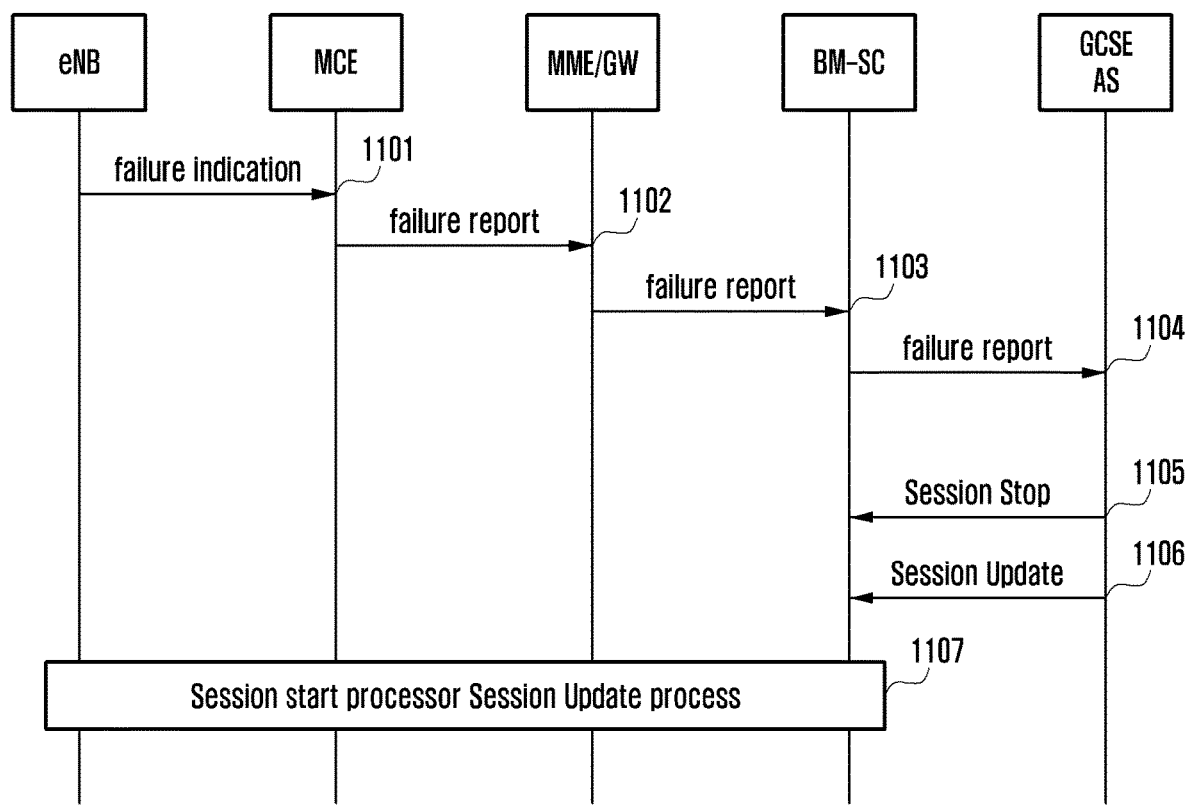
FIG. 11 is a flowchart illustrating a method in accordance with an example of the present disclosure.

In this example, the radio resources usage information reported by an eNB is information indicating an error or a failure occurs in the eNB. When an error or a failure occurs in an eNB which results in the eNB cannot properly transmit data of a service or an error occurs in a user plane between an eNB and an eMBMS GW, the eNB sends a message to an MCE. The MCE sends a message to a GCSE AS. The GCSE AS may transmit service data to the UE via a unicast channel. FIG. 11 is a flowchart illustrating a process of example 7. The process may include the following procedures.

At block 1101, an eNB report an error or failure indication to an MCE.

The error or failure indication may be represented by the name of the message or an information element included in the message. The indication may be sent to the MCE during a conventional reset process. The message may include an identity or an SAI of the eNB or a TMGI that is affected.

At block 1102, the MCE sends an error or failure indication message to the core network.

The message of block 1102 may include the SAI or the identity of the eNB. The message may also include a TMGI which is the identity of a service whose data transmission is affected.

At block 1103, the core network sends an eNB error or failure indication message to a BM-SC.

The core network may forward the message of block 1102 to the BM-SC.

At block 1104, the BM-SC sends an eNB failure or error indication message to a GCSE AS.

At block 1105, the GCSE AS may establish a unicast channel for transporting a GCSE service within an area identified by the SAI or a service area of the eNB. The process is the same with that in conventional mechanisms. Alternatively, the GCSE AS may establish a unicast channel for transporting a GCSE service corresponding to the TMGI sent by the BM-SC. The process is the same with that in conventional mechanisms.

The GCSE AS may send a session stop message to the BM-SC to release the eMBMS bearer or modify the eMBMS bearer. Modifying the eMBMS bearer refers to modifying the service area of the eMBMS bearer and deleting the SAI of the eNB from the service area of the eMBMS bearer.

At block 1106, the BM-SC may send a session stop message or a session update message to the MCE. The process is the same with conventional session stop process or session update process. The process is not described further herein.

Hence, the process of this example is completed.

Example 8

Figure 12:
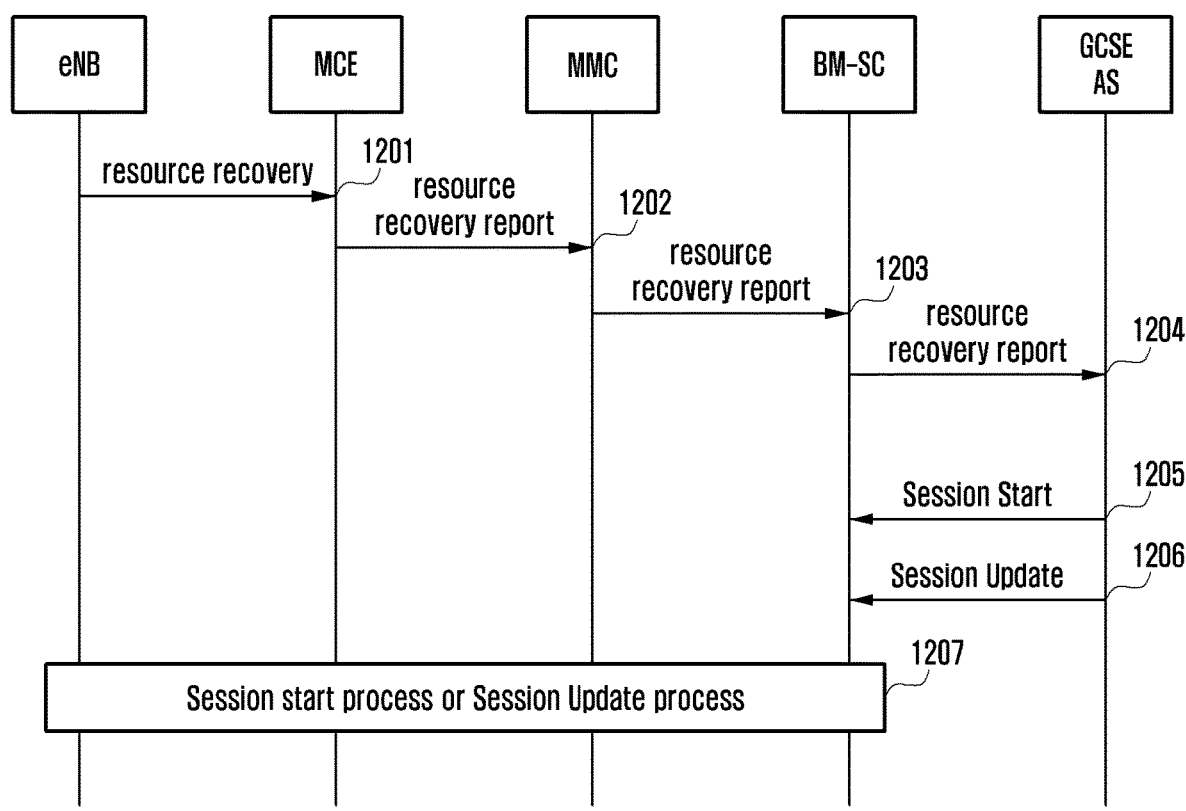
FIG. 12 is a flowchart illustrating a method in accordance with an example of the present disclosure.

In this example, the eMBMS radio resources usage information reported by an eNB is information indicating the eNB has eliminated the overload state or indicating the eNB has recovered from an error or a failure. When an eNB has eliminated the overload state or has recovered from a failure or an error and starts to work normally (properly), the eNB may send a message to inform an MCE of this information. The MCE may send a message to a GCSE AS. The GCSE AS may send service data to a UE via an MCH channel. FIG. 12 is a flowchart illustrating a process of this example. The process may include the following procedures.

At block 1201, an eNB sends a resources recovery report to an MCE.

When the eMBMS radio resources usage information recovers from an overloaded state and are capable of supporting more eMBMS bearers, the eNB report the overload recovery information to the MCE to avoid the MCE still regarding the eMBMS resources are overloaded and rejecting to support other eMBMS bearers. The message may also include resources usage information. Similar to the above examples, the resources usage information may be an actual resource usage level or a percentage value of actually used resources in the eMBMS radio resources. The resources usage information may be for radio resources within an MBSFN area, or for each MCH.

In an example, after the eNB has recovered from a failure or an error and has begun running normally, the eNB may report the information to the MCE. The information about the recovery from the error or the failure may be reported to the MCE via a resources recovery message to the MCE or via a current M2 interface. When the eNB fails, the eNB may send a reset request. When the eNB has recovered, the eNB may send an M2 setup request which is the same with current M2 setup request. The MCE obtains knowledge from the information that the eNB has recovered.

At block 1202, the MCE may send resources recovery information to the core network. The information may include information about the recovery.

After the MCE knows that the eMBMS radio resources of the eNB are no longer overloaded or the eNB can run normally, the MCE may accept new eMBMS services.

The MCE may also send information regarding the recovery to the GCSE AS via the core network.

Besides the overload recovery indication or a recovery-to-normal indication, the message of block 1202 may also include an SAI or an identity of the eNB for specifying the eNB which has recovered from the overload or has returned to normal running state.

The MCE may also send actual usage information of radio resources for specifying actual usage condition of the resources. The actual usage information may be represented by a level (medium or low) or a percentage value.

At block 1203, the core network sends the message to the BM-SC. The message in block 1202 is forwarded.

At block 1204, the BM-SC sends a message to the GCSE AS. The message may include information about the state recovery.

At block 1205, the GCSE AS may transmit a GCSE service using an eMBMS bearer, sends an MBMS session start message to the BM-SC; or the GCSE AS may extend transmission range of the eMBMS bearer, modify the service area of the eMBMS bearer, and send an MBMS update message to the BM-SC.

At block 1206, the BM-SC may send an MBMS session start message or an MBMS session update message to the MCE. The process is the same with conventional session start process or session update process. The process is not described further herein.

Hence, the process of this example is completed.

After receiving the new eMBMS session start message, there is insufficient radio resources and the newly established eMBMS bearer has a higher priority, the eMBMS bearer may occupy radio resources that have been allocated to an eMBMS bearer that has a lower priority. Various examples provide two methods for radio resources management to avoid normal transmission of GCSE service data using the eMBMS bearer whose resources are occupied by the newly established eMBMS bearer.

According to method 1, the MCE informs a UE that the resources have been occupied, and the UE establishes a unicast channel for receiving the GCSE service. In an example, the UE receives eMBMS control information sent by the eNB, sends a request to the GCSE AS in response to a determination that the control information does not include a GCSE service that the UE still wants to receive, and establishes a unicast channel for transmitting downlink data of the GCSE service. In addition, although radio resources of the eMBMS bearer are occupied by another bearer, data is still transmitted to the eNB via the eMBMS bearer and then discarded by the eNB, which is a waste of network resources for backhaul. In order to save backhaul resources, the MCE may inform the GCSE AS that the resources are occupied, and the GCSE AS may initiate an eMBMS release process. In an example, the GCSE AS receives the resource state report sent by the MCE via the BM-SC. The report may include information indicating the radio resources of the established eMBMS bearer have been occupied by a new eMBMS bearer, and a TMGI of the established eMBMS bearer. The GCSE AS terminates the GCSE service transmitted on the established eMBMS bearer, and instructs the BM-SC to release the established eMBMS bearer.

According to method 2, the MCE report information of the resource occupation to the GCSE AS. The GCSE AS transmits a GCSE service transmitted on the eMBMS bearer whose resources are occupied by another bearer, and sends a session stop message to the BM-SC to release the eMBMS bearer. If not doing so, although radio resources of the eMBMS bearer are occupied by another bearer, data is still transmitted to the eNB via the eMBMS bearer and then discarded by the eNB, which is a waste of network resources for backhaul. In an example, the GCSE AS receives the resource state report sent by the MCE via the BM-SC. The report may include information indicating the radio resources of the established eMBMS bearer have been occupied by a new eMBMS bearer, and a TMGI of the established eMBMS bearer. The GCSE AS terminates the GCSE service transmitted on the established eMBMS bearer, and instructs the BM-SC to release the established eMBMS bearer.

The above methods are described with reference to the following examples. The examples are also described through description of interactions between entities.

Example 9

Figure 13:
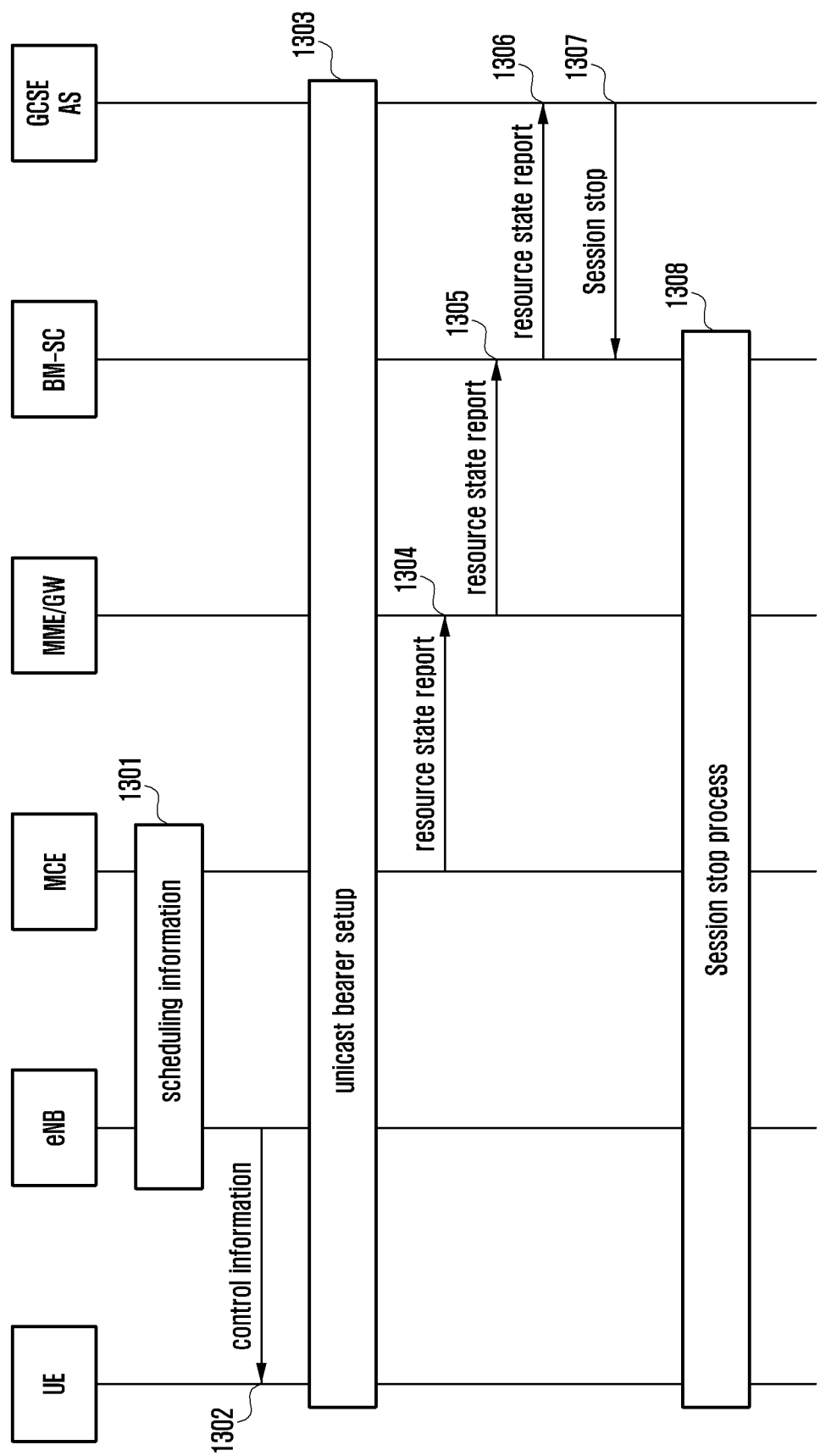
FIG. 13 is a flowchart illustrating a method in accordance with an example of the present disclosure.

FIG. 13 is a flowchart illustrating a process of example 9. The process may include the following procedures.

At block 1301, an MCE sends scheduling information to an eNB.

The MCE decides that a new eMBMS bearer has occupied radio resources of an established first eMBMS bearer, generates new scheduling information which is to be transmitted via an air interface and includes the identity of the new eMBMS bearer and configurations of transmission channels of the new eMBMS bearer and does not include information of the first eMBMS bearer.

At block 1302, the eNB sends control information to a UE.

The eNB sends the new control information via an eMBMS control channel according to scheduling information configured by the MCE. The control information does not include the first eMBMS bearer whose resources have been occupied by the new eMBMS bearer.

At block 1303, if the UE still wants to receive the GCSE service, the UE initiates a process to establish a unicast channel.

The UE obtains information of a GCSE service transported on the bearer identified by the TMGI according to stored information. If the TMGI is not transmitted in the control channel and data channel of the eMBMS bearer and the UE still wants to receive the GCSE service, the UE may initiate a request to establish a unicast channel for transmitting downlink data of the GCSE service. The process is the same with conventional process, and is not described.

GCSE service continuity are maintained through the procedures in blocks 1301 and 1303, and the process of method 1 is completed. The following procedures may be carried out to save backhaul resources.

At block 1304, the MCE sends a resource state report to the core network.

The MCE report the information about the resources being occupied through the message in block 1304. The message may include a TMGI of the first eMBMS bearer. The core network includes an MME and an MBMS-GW.

At block 1305, the core network sends a resource state report to a BM-SC.

The core network reports the information about the resources being occupied to the BM-SC through the message in block 1305. The message may include the identity of the first eMBMS.

At block 1306, the BM-SC sends a resource state report to the GCSE AS.

The core network reports the information about the resources being occupied to the BM-SC through the message in block 1306. The message may include the identity of the first eMBMS.

At block 1307, the GCSE AS sends an eMBMS session stop message to the BM-SC to release the first eMBMS bearer. The message may include the identity of the first eMBMS bearer.

At block 1308, the BM-SC initiates an eMBMS session stop process to release the first eMBMS bearer. The process is the same with the conventional session stop process. The process is not described further herein.

Hence, the process of this example is completed.

Example 10

Figure 14:
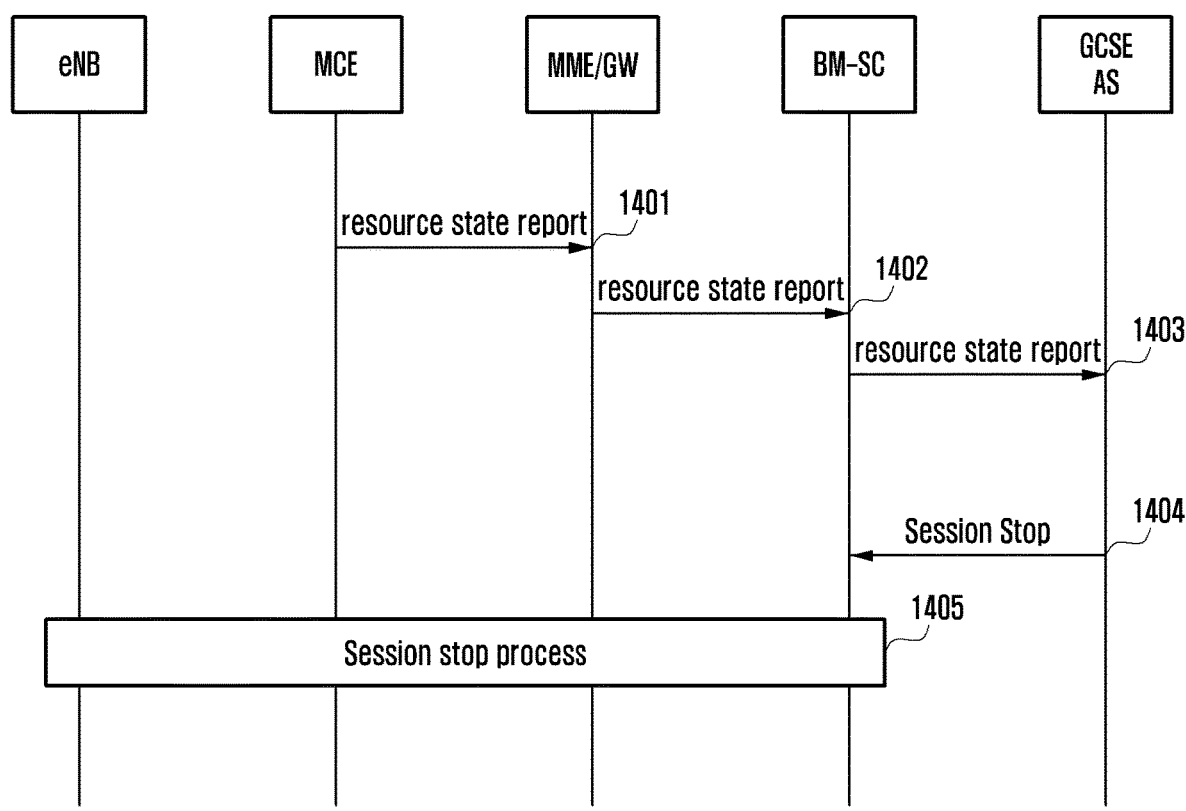
FIG. 14 is a flowchart illustrating a method in accordance with an example of the present disclosure.

FIG. 14 is a flowchart illustrating a process of example 10. The process may include the following procedures.

At block 1401, the MCE sends a resource state report to the core network.

The MCE decides that a new eMBMS bearer has occupied radio resources of an established first eMBMS bearer, generates new scheduling information which is to be transmitted via an air interface and includes the identity of the new eMBMS bearer and configurations of transmission channels of the new eMBMS bearer and does not include information of the first eMBMS bearer.

The MCE report the information about the resources being occupied through the message in block 1401. The message may include a TMGI of the first eMBMS bearer. The core network includes an MME and an MBMS-GW.

At block 1402, the core network sends a resource state report to a BM-SC.

The core network reports the information about the resources being occupied to the BM-SC through the message in block 1402. The message may include the identity of the first eMBMS.

At block 1403, the BM-SC sends a resource state report to the GCSE AS.

The core network reports the information that the resources have been occupied to the BM-SC through the message in block 1403. The message may include the identity of the first eMBMS.

At block 1404, the GCSE AS establishes a unicast channel for transporting a GCSE service corresponding to the TMGI sent by the BM-SC. The process is the same with that in conventional mechanisms.

The GCSE AS sends an eMBMS session stop message to the BM-SC to release the first eMBMS bearer. The message may include the identity of the first eMBMS bearer.

At block 1405, the BM-SC initiates an eMBMS session stop process to release the first eMBMS bearer. The process is the same with the conventional session stop process. The process is not described further herein.

Hence, the process of this embodiment is ended.

The above are several examples of the method of radio resources management of the present disclosure. Various examples also provide an apparatus for radio resources management that is capable of implementing the above methods.

An apparatus for radio resources management of an example may include a reception module and a re-configuration module. The reception module is configured to receive usage information of eMBMS radio resources sent by an eNB, and forward the usage information to the re-configuration module. The re-configuration module is configured to re-configure the eMBMS radio resources to eliminate an overload state when deciding the eMBMS radio resources are overloaded based on the usage information.

An apparatus for radio resources management of another example may include a reception module and a scheduling module. The reception module is configured to receive usage information of eMBMS radio resources sent by a BM-SC, and forward the usage information to the scheduling module. The usage information is determined by the BM-SC based on usage information of the eMBMS radio resources sent by an eNB via an MCE. The scheduling module is configured to adjust scheduling of a service transmitted using the eMBMS radio resources based on the usage information.

An apparatus for radio resources management of another example may include a reception module and a bearer setup module. The reception module is configured to receive information indicating eMBMS radio resources are overloaded sent by an eNB, and forward the information to the bearer setup module. The information includes a TMGI of an eMBMS bearer to which discarded data belongs. The bearer setup module is configured to send a request to a GCSE AS, and establish a unicast channel for transmitting downlink data of a GCSE service transmitted on the eMBMS bearer.

An apparatus for radio resources management of another example may include a reception module and a bearer setup module. The reception module is configured to receive control information sent by an eNB, and forward the control information to the bearer setup module. The control information is determined by the eNB based on scheduling information configured by an MCE. The MCE configures the scheduling information when a new second eMBMS bearer occupies radio resources of an established first eMBMS bearer. The scheduling information includes information of the second eMBMS bearer, and does not include information of the first eMBMS bearer. The bearer setup module is configured to request establishing a unicast channel for transmitting a GCSE service transmitted on the first eMBMS in response to a determination that the control information does not include the information of the first eMBMS bearer and that the UE still needs to receive the GCSE service.

An apparatus for radio resources management of another example may include a reception module and a processing module. The reception module is configured to receive a resource state report sent by an MCE via a BM-SC. The report may include information indicating radio resources of an established first eMBMS bearer have been occupied by a new second eMBMS bearer, and a TMGI of the first eMBMS bearer. The processing module is configured to terminate a GCSE service transmitted on the first eMBMS bearer, and instruct the BM-SC to release the first eMBMS bearer.

The foregoing are only preferred examples of the present disclosure and are not for use in limiting the protection scope thereof. All modifications, equivalent replacements or improvements in accordance with the spirit and principles of the present disclosure shall be included in the protection scope of the present disclosure.

The invention claimed is:

1. A method for providing a multimedia broadcast/multicast service (MBMS) by a base station in a wireless communication system, the method comprising:
    receiving, from a network entity via an M2 interface, a first message including first information for configuring a physical multicast channel (PMCH) for a MBMS and second information on one or more service identity associated with the PMCH;
    generating third information indicating an overload status of the PMCH; and
    transmitting, to the network entity via the M2 interface, a second message including an identifier of a multicast broadcast single frequency network (MBSFN) area associated with the MBMS, the third information indicating the overload status of the PMCH, and fourth information on at least one service identity of the one or more service identity associated with the PMCH.

2. The method of claim 1, wherein the one or more service identity includes one or more temporary mobile group identity (TMGI), and
    wherein at least one service identity includes at least one TMGI.

3. The method of claim 1, further comprising receiving, from the network entity, a third message reconfiguring the PMCH based on the third information and the fourth information, in case that the third information indicates that the PMCH is overloaded,
    wherein the network entity is a multi-cell/multicast coordination entity (MCE), and
    wherein the PMCH is reconfigured by at least one of the MCE, a broadcast/multicast service center (BM-SC) and a group communication system enabler application server (GCSE-AS).

4. A method for providing a multimedia broadcast/multicast service (MBMS) by a network entity in a wireless communication system, the method comprising:
    transmitting, to a base station via an M2 interface, a first message including first information for configuring a physical multicast channel (PMCH) for a MBMS and second information on one or more service identity associated with the PMCH; and
    receiving, from the base station via the M2 interface, a second message including an identifier of a multicast broadcast single frequency network (MBSFN) area associated with the MBMS, the third information indicating the overload status of the PMCH, and fourth information on at least one service identity of the one or more service identity associated with the PMCH.

5. The method of claim 4, wherein the one or more service identity includes one or more temporary mobile group identity (TMGI), and
wherein at least one service identity includes at least one TMGI.

6. The method of claim 4, further comprising transmitting, to the base station via the M2 interface, a third message reconfiguring the PMCH based on the third information and the fourth information, in case that the third information indicates that the PMCH is overloaded,
wherein the network entity is a multi-cell/multicast coordination entity (MCE), and
wherein the PMCH is reconfigured by at least one of the MCE, a broadcast/multicast service center (BM-SC) and a group communication system enabler application server (GCSE-AS).

7. A base station for providing a multimedia broadcast/multicast service (MBMS) in a wireless communication system, the base station comprising:
a transceiver configured to transmit and receive signals; and
a controller configured to:
receive, from a network entity via an M2 interface, a first message including first information for configuring a physical multicast channel (PMCH) for a MBMS and second information on one or more service identity associated with the PMCH,
generate third information indicating an overload status of the PMCH, and
transmit, to the network entity via the M2 interface, a second message including an identifier of a multicast broadcast single frequency network (MBSFN) area associated with the MBMS, the third information indicating the overload status of the PMCH, and fourth information on at least one service identity of the one or more service identity associated with the PMCH.

8. The base station of claim 7, wherein the one or more service identity includes one or more temporary mobile group identity (TMGI), and wherein at least one service identity includes at least one TMGI.

9. The base station of claim 7, wherein the controller is further configured to receive, from the network entity, a third message reconfiguring the PMCH based on the third information and the fourth information, in case that the third information indicates that the PMCH is overloaded,
wherein the network entity is a multi-cell/multicast coordination entity (MCE), and
wherein the PMCH is reconfigured by at least one of the MCE, a broadcast/multicast service center (BM-SC) and a group communication system enabler application server (GCSE-AS).

10. A network entity for providing a multimedia broadcast/multicast service (MBMS) in a wireless communication system, the network entity comprising:
a transceiver configured to transmit and receive signals; and
a controller configured to:
transmit, to a base station via a M2 interface, a first message including first information for configuring a physical multicast channel (PMCH) for a MBMS and second information on one or more service identity associated with the PMCH, and
receive, from the base station via the M2 interface, a second message including an identifier of a multicast broadcast single frequency network (MBSFN) area associated with the MBMS, the third information indicating the overload status of the PMCH, and fourth information on at least one service identity of the one or more service identity associated with the PMCH.

11. The network entity of claim 10, wherein the one or more service identity includes one or more temporary mobile group identity (TMGI), and
wherein at least one service identity includes at least one TMGI.

12. The network entity of claim 10, wherein the controller is further configured to transmit, to the base station via the M2 interface, a third message reconfiguring the PMCH based on the third information and the fourth information, in case that the third information indicates that the PMCH is overloaded,
wherein the network entity is a multi-cell/multicast coordination entity (MCE), and
wherein the PMCH is reconfigured by at least one of the MCE, a broadcast/multicast service center (BM-SC) and a group communication system enabler application server (GCSE-AS).

\* \* \* \* \*